(12) United States Patent
Gadd et al.

(10) Patent No.: US 12,079,257 B2
(45) Date of Patent: Sep. 3, 2024

(54) METHOD AND SYSTEM FOR RETRIEVING COUPONS AND SURVEYS ON A MOBILE DEVICE

(71) Applicant: Kindred Soul Ltd., Cambridge (GB)

(72) Inventors: Michael Gadd, London (GB); Aaron Simpson, London (GB); Matthew Larter, London (GB); Shems Eddine Boukhatem, London (GB); Robyn Chin, London (GB)

(73) Assignee: Kindred Soul Ltd., Cambridge (GB)

( * ) Notice: Subject to any disclaimer, the term of this patent is extended or adjusted under 35 U.S.C. 154(b) by 146 days.

(21) Appl. No.: 17/686,026

(22) Filed: Mar. 3, 2022

(65) Prior Publication Data

US 2022/0284050 A1 Sep. 8, 2022

Related U.S. Application Data

(60) Provisional application No. 63/239,227, filed on Aug. 31, 2021, provisional application No. 63/156,153, filed on Mar. 3, 2021.

(51) Int. Cl.
*G06F 16/00* (2019.01)
*G06F 3/0481* (2022.01)
(Continued)

(52) U.S. Cl.
CPC ........ *G06F 16/3329* (2019.01); *G06F 3/0481* (2013.01); *G06F 3/04886* (2013.01);
(Continued)

(58) Field of Classification Search
CPC ............. G06F 16/3329; G06F 16/3322; G06F 16/955; G06F 16/951; G06F 16/9032
See application file for complete search history.

(56) References Cited

U.S. PATENT DOCUMENTS 8,347,398 B1 1/2013 Weber
8,868,451 B2 * 10/2014 Greaves ............. G06Q 30/0623
705/7.29
(Continued)

FOREIGN PATENT DOCUMENTS

KR 20060116042 A 11/2006
WO 2014117244 A1 8/2014
(Continued)

OTHER PUBLICATIONS

Robert Heaton; How does online tracking actually work ?; Nov. 20, 2017; robertheaton.com; pp. 1-15.
(Continued)

*Primary Examiner* — Noosha Arjomandi
(74) *Attorney, Agent, or Firm* — EIP US LLP

(57) ABSTRACT

Systems and methods relating to a keyboard interceptor on a mobile device are disclosed. The keyboard interceptor receives a first input and generates a search query based on the first input. Data is located based on the search query, the located data being associated with a record, the record comprising a record identifier. The located data comprises at least one of: a coupon code, and one or more survey questions. The keyboard application associates a GUI element with the record identifier and receives a second input, by a user, corresponding to selection of the GUI element. Responsive to receiving the second input, the keyboard application performs an action comprising one of: passing the coupon code into a text field within a webpage, and displaying the one or more survey questions in the GUI of the mobile device.

20 Claims, 11 Drawing Sheets

(51) Int. Cl.
*G06F 3/04886* (2022.01)
*G06F 3/04895* (2022.01)
*G06F 16/242* (2019.01)
*G06F 16/332* (2019.01)
*G06F 16/9532* (2019.01)
*G06F 16/955* (2019.01)
*G06Q 30/0207* (2023.01)

(52) U.S. Cl.
CPC ...... *G06F 3/04895* (2013.01); *G06F 16/2423* (2019.01); *G06F 16/3322* (2019.01); *G06F 16/9532* (2019.01); *G06F 16/955* (2019.01); *G06Q 30/0207* (2013.01)

(56) References Cited

U.S. PATENT DOCUMENTS

| | | |
|---|---|---|
| 9,806,942 B2 | 10/2017 | Saxena et al. |
| 10,055,103 B1 | 8/2018 | Ozuysal |
| 10,228,819 B2 | 3/2019 | Dostie et al. |
| 10,423,303 B1 | 9/2019 | Roach et al. |
| 10,606,477 B1* | 3/2020 | Donnici ................ G06F 40/274 |
| 10,824,656 B2* | 11/2020 | Hwang ................ G06F 16/335 |
| 10,887,201 B2 | 1/2021 | Park |
| 11,068,940 B2* | 7/2021 | Kim .................... G06Q 30/0207 |
| 11,430,000 B1* | 8/2022 | Depaolo ............ G06Q 30/0601 |
| 2001/0047347 A1 | 11/2001 | Perell et al. |
| 2005/0027670 A1 | 2/2005 | Petropoulos |
| 2005/0043939 A1 | 2/2005 | Trower et al. |
| 2006/0055780 A1 | 3/2006 | Zemer et al. |
| 2007/0011340 A1 | 1/2007 | Seidl et al. |
| 2008/0082905 A1 | 4/2008 | Martinez et al. |
| 2011/0099251 A1* | 4/2011 | Tsukada ................ G06F 16/958 709/219 |
| 2012/0197981 A1 | 8/2012 | Chan |
| 2013/0073388 A1 | 3/2013 | Heath |
| 2013/0205198 A1 | 8/2013 | Cohen |
| 2013/0227057 A1 | 8/2013 | Goldstein et al. |
| 2015/0073892 A1 | 3/2015 | Brown et al. |
| 2015/0106181 A1* | 4/2015 | Kluth ................ G06Q 30/0222 705/14.23 |
| 2015/0143269 A1 | 5/2015 | Liu et al. |
| 2015/0154660 A1 | 6/2015 | Weald et al. |
| 2016/0103876 A1 | 4/2016 | Bakir et al. |
| 2017/0032147 A1 | 2/2017 | Denner et al. |
| 2017/0054820 A1 | 2/2017 | Webber et al. |
| 2017/0193481 A1 | 7/2017 | Szeto et al. |
| 2018/0046637 A1 | 2/2018 | Koopman et al. |
| 2018/0293601 A1 | 10/2018 | Glazier |
| 2018/0293602 A1 | 10/2018 | Glazier et al. |
| 2018/0293603 A1 | 10/2018 | Glazier et al. |
| 2018/0315041 A1* | 11/2018 | Wynn ................ G06Q 30/0601 |
| 2018/0322519 A1* | 11/2018 | Goecke ............ H04M 1/72403 |
| 2019/0066156 A1* | 2/2019 | McMichael ........ G06Q 30/0267 |
| 2019/0347685 A1 | 11/2019 | Glazier et al. |
| 2020/0082423 A1 | 3/2020 | Glazier et al. |
| 2020/0242648 A1* | 7/2020 | Glazier ................. H04L 67/535 |
| 2020/0364734 A1 | 11/2020 | Glazier et al. |
| 2021/0124630 A1 | 4/2021 | Chew et al. |
| 2021/0168140 A1 | 6/2021 | Canfield et al. |
| 2021/0192003 A1 | 6/2021 | Kargaran |
| 2022/0284050 A1* | 9/2022 | Gadd .................. G06F 16/9032 |
| 2022/0284063 A1* | 9/2022 | Gadd .................. G06F 3/04895 |
| 2023/0052456 A1* | 2/2023 | Gadd .................. G06F 3/04886 |
| 2023/0300183 A1* | 9/2023 | Craparo .............. H04L 65/1069 709/204 |

FOREIGN PATENT DOCUMENTS

| | | |
|---|---|---|
| WO | 2017072589 A2 | 5/2017 |
| WO | 2017184212 A1 | 10/2017 |
| WO | 2018191030 A1 | 10/2018 |

OTHER PUBLICATIONS

"Anonymous: ""Sharing Content with Intents|CodePath Android Cliffnotes""", Aug. 25, 2014 (Aug. 25, 2014), pp. 1-3, KP055947268,Retrieved from the Internet: URL:https://web.archive.org/web/20140825084305/https://guides.codepath.com/android/sSharing-Content-with-Intents [retrieved on Jul. 29, 2022] the whole document".

"Anonymous: ""javascript—chrome extensioncode to get current active tab url and detect any url update in it as well—Stack Overflow""", Feb. 28, 2019 (Feb. 28, 2019), pp. 1-2, XP055947269, Retrieved from the Internet: URL:https://web.archive.org/web/20190228230505/https://stackoverflow.com/questions/54821584/chrome-extension-code-to-get-current-active-tab-url-and-detect-any-url-update-in [retrieved on Jul. 29, 2022] the whole document".

U.S. Office Action dated Feb. 13, 2024 for U.S. Appl. No. 17/980,466.

* cited by examiner

METHOD AND SYSTEM FOR RETRIEVING COUPONS AND SURVEYS ON A MOBILE DEVICE

CROSS-REFERENCE TO RELATED APPLICATIONS

This application claims the benefit of U.S. Provisional Application No. 63/156,153, filed Mar. 3, 2021 and U.S. Provisional Application No. 63/239,227, filed Aug. 31, 2021. The above-referenced patent applications are incorporated by reference in their entirety.

BACKGROUND OF THE INVENTION

Field of the Invention

The present disclosure relates to mobile computing devices. In particular, the present disclosure relates to a method and system for retrieving data on a mobile device and more particularly to retrieving at least one of: a coupon code, and one or more survey questions using a keyboard application for mobile computing devices.

Description of Related Art

Web browsers are software applications that provide access to the World Wide Web. On many computing devices, such as desktop computers, web browser extensions are available for web browsers. A web browser extension is a software application that adds a capability, utility, or functionality to a web browser. Mostly, web browser extensions extend or enhance the functionality of the web browser, interact with websites, provide proactive information based on browsing, or provide useful tools to enhance the user experience.

Web browsers are also available for mobile devices and offer similar functionality to their desktop counterparts. On mobile devices, some web browsers, such as Safari® on iOS® (14 and lower) and Chrome™ on Android™, lack web browser extension support. Thus, the enhanced functionality provided by web browser extensions may not be available to mobile device users. There are several reasons why web browser extensions are not available on some mobile web browsers. For example, extensions present on a laptop or desktop may not be intuitive enough to use on the screen sizes available on mobile devices. There are also security restrictions within mobile operating systems, and limitations with web browser application capacity. Further, mobile operating systems may prioritise stability and therefore have fewer features compared to desktop based operating systems.

On the other hand, some mobile web browsers, such as Safari® on iOS® 15, do support web browser extensions. However, as noted above, there can be challenges in implementing these in an intuitive and easy to use manner on the smaller hardware and software of mobile devices. It is therefore desirable to improve the user experience when both mobile web browser extensions are, and are not, available.

An implementation of a desktop web browser extension may be in displaying content to a user, such as an advertisement, as they are accessing a web browser application. Targeting a user's mobile device is an effective form of advertising given that most users carry their mobile device with them at all times. However, because of the above-mentioned difficulties with web browser extensions on mobile devices, brands are often limited to displaying content to a user via pop up adverts in a website the user is currently browsing via a mobile web browser application. These advertisements can often feel intrusive and their relevance may depend on the user's previous browser history. Furthermore, brands are limited in the content they can include in such advertisements due to screen space and bandwidth constraints. Alternatively, if the user has an app associated with the brand on their mobile device, the app may forward push notifications to the user. The content of push notifications is typically limited to a single line of text, and an inattentive user may simply dismiss the notification without reading it. An improved advertisement targeting method is therefore desirable.

SUMMARY

According to a first aspect of the present disclosure, there is provided a computer-implemented method to be performed by a mobile device of a user comprising:
  receiving, by a keyboard application executing on a mobile device, a first input;
  generating, by the keyboard application, a search query based on the first input;
  locating data based on the search query, wherein the located data is associated with a record, the record comprises a record identifier, and the located data comprises at least one of:
    a coupon code; and
    one or more survey questions;
  associating, by the keyboard application, a graphical user interface, GUI, element of the mobile device, with the record identifier of the located data;
  receiving, by the keyboard application, a second input, by a user, corresponding to selection of the GUI element;
  responsive to receiving the second input, performing, by the keyboard application, an action associated with the located data, wherein the action comprises one of:
    causing the coupon code associated with the located data to be passed into a text field within an application executing on the mobile device; and
    displaying the one or more survey questions associated with the located data in the GUI of the mobile device.

The computer-implemented method may be at least partially performed by a keyboard application on the mobile device. Therefore, the computer-implemented methods provide replicated functionality of desktop web browser extensions for the mobile device by means of a keyboard application.

The computer-implemented method provides a convenient search for data such as coupon codes and surveys and has advantages over known methods executing on mobile devices. One such advantage is that the first input need not be provided by a user. For example, the keyboard application may receive data indicative of current content displayed in the GUI of the mobile device, and determine a domain name associated with a website currently being viewed by the user by analyzing the data indicative of the current content displayed in the GUI of the mobile device. In this case, the first input may comprise the determined domain name. The current content displayed in the GUI of the mobile device may comprise a screenshot of the GUI of the mobile device. In another example, the current content displayed in the GUI is received from an accessibility service operating on the mobile device.

In some cases, a mobile web browser application may support mobile web browser extension capability. In such cases, the keyboard application may receive, from a web browser extension associated with the web browser application, a domain name associated with a website currently being accessed by the web browser application. The first input may then comprise the domain name.

In some examples, the keyboard application may receive, from an application executing on the mobile device and currently being accessed, an identifier associated with the application that uniquely identifies the application. In this case, the first input may comprise the identifier associated with the application.

In further examples, responsive to receiving the second input, the keyboard application may, without user input, generate a unique tracking link comprising a URL and a randomly generated identifier, the URL being for a website associated with the located data. The keyboard application may pass the unique tracking link to an address bar of a web browser application executing on the mobile device.

When the located data comprises a coupon code, the keyboard application may store the coupon code in memory. Prior to passing the coupon code into the text field, the keyboard application may determine that that text field is a text field designated for coupon codes. Determining that the text field is a text field designated for coupon codes may comprise analyzing, by the keyboard application, a screenshot of the GUI of the mobile device. In another example, determining that the text field is a text field designated for coupon codes may comprise receiving, by the keyboard application, a field designation type from an autofill service operating on the mobile device. In yet another example, determining that the text field is a text field designated for coupon codes may comprise receiving, by the keyboard application, a field designation type from a web browser extension associated with a web browser application executing on the mobile device.

The coupon code and/or one or more survey questions may be associated with a merchant. The merchant may determine that the user has used a coupon code or completed a survey. An example of how this can be achieved is as follows. Responsive to receiving the second input, the keyboard application may generate, without user input, a randomly generated identifier associated with the selection of the GUI element. The randomly generated identifier may be stored in a database in association with the record identifier and a user identifier. Further, the web browser application may store a cookie comprising the randomly generated identifier associated with the selection of the GUI element. In this case, a new tab may be opened within the web browser application, so that the cookie is stored when the new tab is opened. The new tab may be closed when the cookie has been stored. The new tab may be opened and closed by the keyboard application or a web browser extension.

The randomly generated identifier, stored both in the database and as part of the cookie, allows the merchant to track the action(s) performed by the user. An indication of the action(s) performed, as well as the randomly generated identifier associated with the action(s), may be transmitted to an entity associated with the database. The transmission may further comprise a commission associated with the performed action(s). The entity may provide a portion of this commission to the user as a reward for performing the action(s). The entity may identify the user by matching the randomly generated identifier in the transmission with the randomly generated identifier stored in the database in association with the user identifier.

When the located data comprises one or more survey questions, the computer-implemented method may further comprise receiving one or more further inputs by the user, said further inputs corresponding to completion of the one or more survey questions, and storing, in a database, data indicative of the one or more further inputs in association with a randomly generated identifier and a user identifier.

Locating the data may include forwarding an application programming interface, API, call to a server. Alternatively, locating the data may include performing a search of a local storage of the mobile device.

As discussed, the data may be merchant data, and include one or more of a coupon code, one or more survey questions, and media associated with the merchant. The merchant data may further comprise a logo associated with the merchant, and an active deal associated with the merchant. In this case, associating the element of the GUI with the record identifier may comprise displaying the logo associated with the merchant and text indicating the active deal.

The method may further comprise displaying an icon within a user interface of the keyboard application indicating that the data has been located. A further input, by the user, may be received corresponding to selection of the icon. In this case, displaying the element of the GUI is responsive to receiving the further input.

According to a second aspect of the present disclosure there is provided a tangible, non-transitory computer-readable memory comprising instructions, that when performed by a processor of a mobile device, cause a keyboard application executing on the mobile device to perform the above-described methods.

According to a third aspect of the present disclosure there is provided a system. The system comprises a keyboard application, a database and a server communicatively coupled to the database. The database comprises a plurality of records, each of the records comprising: a record identifier and data, the data comprising one or more coupon codes and one or more survey questions. The server is configured to locate data in the database in response to receiving an API call. The system is configured to perform the methods according to the first aspect of the present disclosure.

Further features and advantages of the invention will become apparent from the following description of preferred embodiments of the invention, given by way of example only, which is made with reference to the accompanying drawings.

DETAILED DESCRIPTION

Web browsers running on certain computing devices, such as desktop computing devices, may interface with one or more web browser extensions. A web browser extension may enhance a certain functionality of the web browser. In one example, a web browser extension searches for, and inserts, one or more coupon codes into a webpage currently being accessed by a user. In another example, a web browser extension may search for, and allow a user to complete, one or more surveys as they are browsing an arbitrary website. An entity associated with the web browser extension may receive a commission for providing the coupon code or survey. For completion of a survey, the user may receive a portion of this commission from the entity associated with the web browser extension, which may be in the form of a coupon code, donation to charity, or other financial incentive.

Embodiments described herein relate to a keyboard interceptor for mobile devices. In some embodiments a keyboard interceptor may be software that replicates the same level of interactivity, information and utility found in a desktop or laptop web browser extension but is separate from a mobile web browser. These embodiments are particularly well suited for mobile devices configured with web browsers such as Safari® on iOS® 14 or lower, and Chrome™ on Android™, where web browser extensions are not available. In other embodiments a keyboard interceptor may be software embodied as a browser extension. These embodiments are particularly well suited for mobile devices mobile devices configured with web browsers such as Safari® on iOS® 15 or higher. Various implementations of such a keyboard interceptor will now be described.

Figure 1:
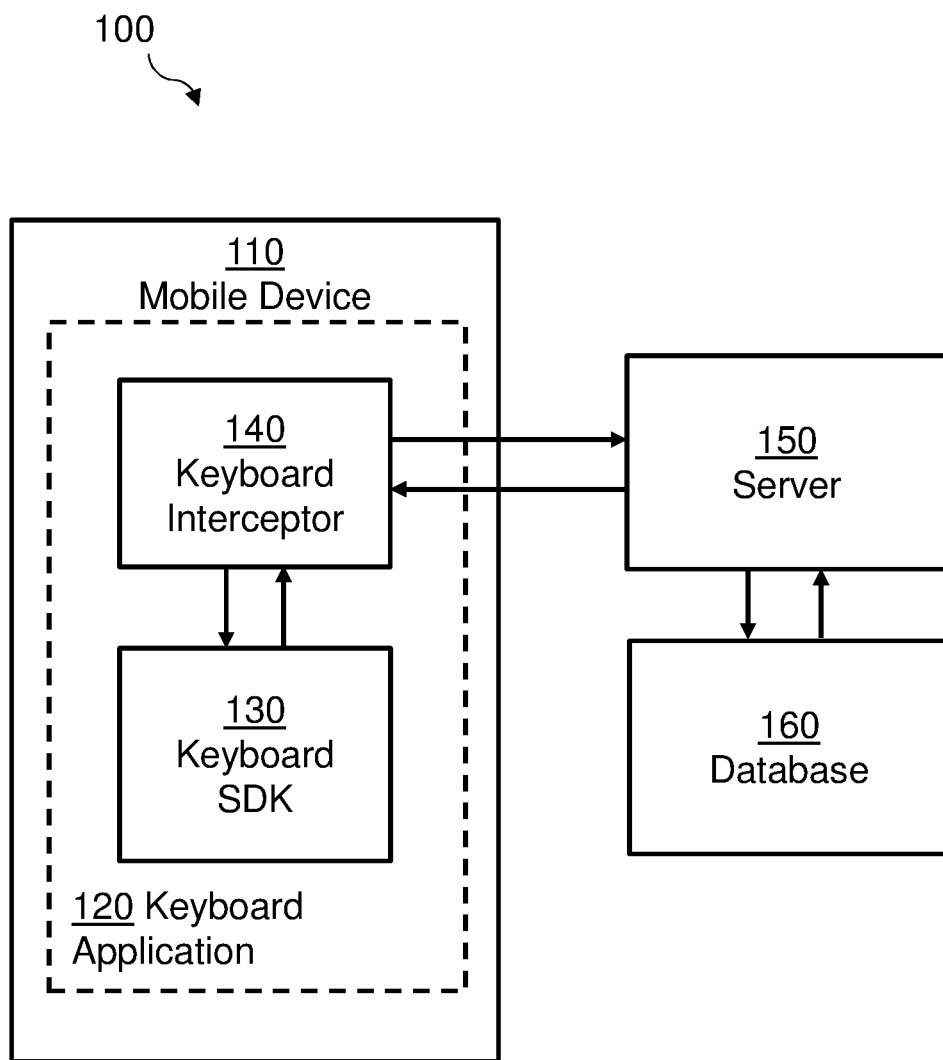
FIG. 1 illustrates schematically a system according to an example.
Figure 2:
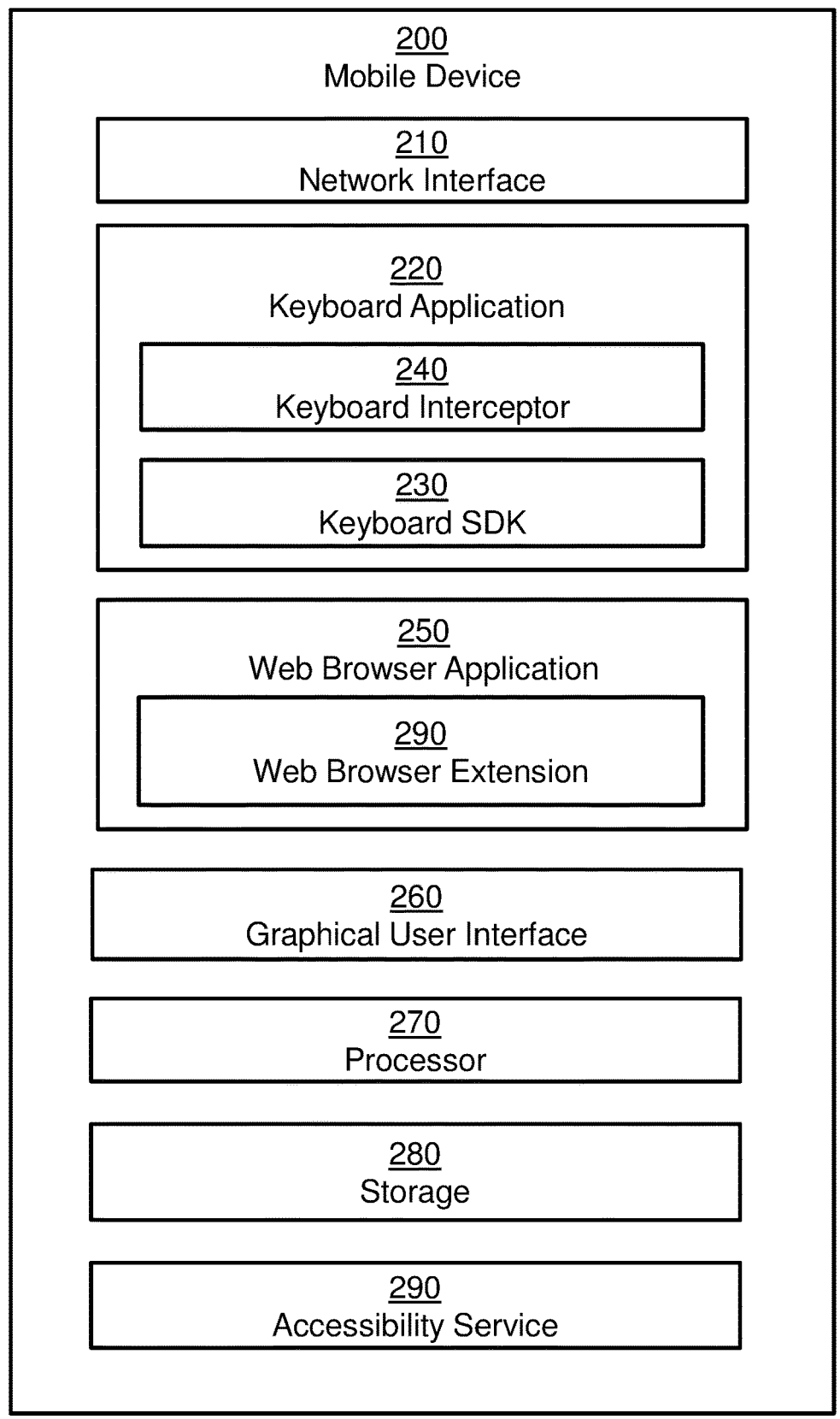
FIG. 2 illustrates schematically a mobile device according to an example.

These embodiments will now be discussed with reference to FIGS. 1-9. FIG. 1 illustrates a system 100 according to an example comprising a mobile device 110, a server 150 and a database 160. In particular, FIG. 1 illustrates how a mobile device 110 comprising a keyboard interceptor 140 can communicate with the server 150 to source data. FIG. 2 illustrates a mobile device 200 according to another example. The mobile device 110 shown in FIG. 1 may be an example of the mobile device 200 shown in FIG. 2, but without for example a web browser extension. This may be due to hardware or software limitation as discussed above, or a design choice of the provider of a web browser application.

Referring to FIG. 1, the mobile device 110 is a mobile computing device that generally supports a mobile operating system, such as a smart phone and a tablet computer. The mobile device 110 is communicatively coupled to the server 150. The server 150 is further communicatively coupled to the database 160. The database 160 stores data relating to brands, and for any given brand the data may be stored in fields of the database, the fields comprising one or more of coupon, voucher and discount codes and surveys relating to that brand, as well as possibly one or more URLs, metadata such as offers, keywords, categories and descriptions etc., and media such as images, video and audio relating to that brand.

The mobile device 110 comprises a keyboard application 120. Third-party, or custom, keyboards are available on mobile devices and provide an alternative to native keyboards that are included as part of the mobile operating system. Custom keyboards can be provided as a software development kit (SDK) to include within an application that acts as a container for the SDK, wherein the SDK provides keyboard functionality. Thus, a user wanting to use a custom keyboard must download an application that includes a keyboard with custom keyboard functionality. It will be appreciated that custom keyboards are not limited to those provided by an SDK but can be custom built within the mobile application itself. This functionality is detectable by the mobile operating system. The user can change input methods from the native keyboard to the custom keyboard through the settings, for example. A keyboard application, such as the keyboard application 120 in FIG. 1, will be understood to mean a container application including an SDK providing keyboard functionality. This can include custom keyboard applications as described above, or native keyboard applications. Further, an SDK providing keyboard functionality will be referred to as a keyboard SDK. The keyboard application 120 may be provided by an entity associated with the server. Alternatively, the keyboard application 120 may be provided by a third-party that differs from the entity associated with the server 150. In this case, the database 160 may have a record comprising data associated with the third party. The third-party may be an entity that provides goods and/or services in exchange for payment. For example, the third party may be a subscription service provider, a utility service provider, or a merchant selling goods. In one example, the keyboard application 120 may be provided as part of a mobile network billing application. The mobile network billing application may be downloadable from an application repository compatible with the operating system running on the mobile device 110 or may be preloaded onto the mobile device 110. The mobile network billing application may be required for a user to monitor information associated with an account registered with the mobile network. In another example, the keyboard application 120 may be provided as part of a game application. The game application may also be downloadable from an application repository compatible with the operating system running on the mobile device 110 or may be preloaded onto the mobile device 110. In a further example, the keyboard application 120 may be a native keyboard application which may be provided by the manufacturer of the mobile device 110 and/or the developer of the operating system executing on the mobile device 110.

The keyboard application 120 may allow for a user to set up an account associated with the provider of the keyboard application 120. The account may allow a user to view and track their rewards awarded through use of the keyboard application 120. The account could also be used by the user to withdraw their rewards. Withdrawing a reward may involve connecting to a payment service in order to deposit funds and/or add credits to one or more apps also on the mobile device 110.

In the example shown in FIG. 1 the keyboard application 120 enables a user to interact with the mobile device 110 through functionality provided to the keyboard application via keyboard SDK 130, which is to be understood to be an exemplary keyboard SDK having the features described above. The keyboard SDK 130 enables the keyboard application 120 to display a virtual keyboard on a touchscreen of the mobile device 110, through which a user may type characters into the mobile device 110. The characters may relate to any language and/or symbols. In another example, the keyboard SDK 130 may be operatively associated with a software component that converts speech to text for display by the keyboard application 120 via a user interface.

In embodiments described herein, the mobile device 110 further comprises a keyboard interceptor 140. The keyboard interceptor 140 is provided as part of the keyboard application 120, for example as part of a container application further comprising an SDK that provides keyboard functionality. The keyboard interceptor 140 may alternatively be provided in a separate SDK for use with a keyboard SDK 130 such as a native keyboard SDK.

The keyboard interceptor 140 may be configured to monitor input via the functionality provided by the keyboard SDK 130. That is, the keyboard interceptor 140 tracks an input in the form of typed text or text resulting from speech to text etc. The keyboard SDK 130 may include an event listener application programming interface (API). The event listener API allows the keyboard interceptor 140 to receive event notifications indicating input to the keyboard by the user. In the example where a user is typing, the keyboard SDK 130 may include a specific text input monitoring API. The keyboard interceptor 140 can then communicate with the keyboard SDK 130 via the text input monitoring API to receive event notifications corresponding to text entered by the user. In a further example, the keyboard interceptor 140 may receive every event notification issued via the event listener API and determine which event notifications correspond to entered text.

The keyboard interceptor 140 may, alternatively or in addition, be configured to communicate with, and accept input from, one or more applications also present on the mobile device 110. As will be discussed with regards to FIG. 2, the mobile device 110 may also be configured with one or more or of a web browser extension associated with a web browser application, and an accessibility service. In this case, the keyboard interceptor 140 may be configured to accept a URL of a webpage being accessed by a web browser application from the web browser extension, for example. The keyboard interceptor 140 may be configured to accept current content in the graphical user interface (GUI) of the mobile device from the accessibility service, for example.

The keyboard interceptor 140 is configured to generate search queries based on a first input. The first input may be any of the above described inputs. The search query may be based on exact content of the first input. For example, if the first input is the text string "jon", then the search query generated by the keyboard interceptor 140 may be based on the text string "jon". In another example, the keyboard interceptor 140 may first modify the first input prior to generating the search query. For example, if the first input is the text string "jon", the keyboard interceptor 140 may modify the text string to "john", and therefore generate a search request based on the text string "john". In another example, the input is formed by analysing current content of the GUI of the mobile device 110. The current content of the GUI may be obtained from a screenshot of the GUI or via accessibility services operating on the mobile device 110. In this case, the keyboard interceptor 140 may extract information from the current content, such as text displayed within the GUI, to form the input. In a further example, the input may be formed based on information provided to the keyboard interceptor 140 via a browser extension associated with a web browser application. In this case, the input may be a domain name associated with a URL for a webpage currently being accessed by the web browser application.

The keyboard interceptor 140 then makes an API call to the server 150, causing the server 150 to locate data based on the search query. The request may be sent as a "GET" Hypertext Transfer Protocol (HTTP) request containing the text string "john". On receipt of the HTTP request, the server 150 communicates with the database 160 in order to locate data matching the entered text string (in this example "john"). As explained above, the database 160 stores data relating to brands, and for any given brand the data may be stored in fields of the database, the fields comprising at least one of a coupon code and a survey, as well as possibly one or more of URLs, metadata such as offers, keywords, categories, descriptions, and media etc. of that brand. For each brand, the data for that brand can be linked via a unique record identifier (ID), which is generated by the server 150.

The term coupon code is understood to refer to any code that affects at least one aspect of a purchase. For instance, a coupon code may activate one or more deals associated with a purchase item when input into a webpage associated with the purchase item. Therefore, the terms coupon code, voucher code and discount code are synonymous, and should all be understood to refer to such codes. The deals can include a percentage reduction in the price of one or more purchase items, a fixed price reduction in the one or more purchase items, one or more free items, and one or more services relating to the one or more purchase items such as free shipping etc. Other examples of deals that affect at least one aspect of a purchase are envisaged.

A survey is understood to comprise one or more survey questions, and possibly includes metadata relating to the survey(s), such as a discount amount for completion of the survey, and titles of the one or more surveys. The one or more survey questions can be used to gauge a user's opinion on a particular matter. The questions may require input of any of text, images, video, and audio from the user, and which may be provided by the keyboard application 120. Each survey may also have an associated survey identifier because multiple surveys may exist within the same record in the database 160. The survey identifier can be used to identify a survey amongst other surveys in the same record.

When the server 150 performs a search of the database 160 for data entries that match the entered text string, the server 150 submits a query that will be executed by the database 160 across all database entries. This may involve communicating with an external service, such as Azure™ search service. When a database entry that matches the query is located, the server 150 retrieves an above-mentioned corresponding unique record ID, and sends that unique record ID in a message to the keyboard interceptor 140 e.g. as a HTTP message. This allows the server 150 to identify entries in the database in future without having to perform a further search. The message may also include data (e.g. name of the brand, logo of the brand) retrieved from one or more of the database fields that match the search query.

In one example, the first input may comprise a descriptive keyword, such as "trainer". This causes the keyboard interceptor 140 to generate a search query for the text "trainer". The server 150 then performs a search of the database 160 for entries relating to the text "trainer". In this example, the database 160 may return e.g. the brand Nike®, if that is stored in a database field in association with keyword "trainer". The message sent to the keyboard interceptor 140 may then indicate that data relating to the brand Nike® has been located based on the search term "trainer". The message also includes a unique record ID, which, as mentioned above, has been generated by the server 150.

The server 150 may provide the keyboard interceptor 140 with one or more authentication tokens as part of an initial configuration process for use by the keyboard application 120 when authenticating the keyboard interceptor 140 to the server 150. The authentication tokens may be issued if the server 150 can determine that the user of the keyboard interceptor 140 is validly registered with the server 150. This may require the user to register an account with an entity associated with the server 150. For example, if the keyboard application 120 is associated with the same entity that is associated with the server 150, then the user may provide login details to the keyboard application 120. Successful login by the user causes the keyboard application 120 to receive an access token that can be used to authenticate communication between the server 150, and the keyboard application 120 and/or the keyboard interceptor 140. When the keyboard application 120 is not associated with the same entity that is associated with the server 150, such as when the keyboard application 120 is associated with a mobile network operator, the keyboard interceptor 140 may communicate directly with the server 150 to receive an access token. The server 150 may also issue one or more refresh tokens to the keyboard application 120 and/or the keyboard interceptor 140. The refresh tokens are configured to renew the access token and may conform to the OAuth protocol.

In either case, the authentication tokens may include information about the user. The information may include one or more identifiers associated with the user. In one example, the identifier associated with the user comprises a device ID. The device ID may be derived from the International Mobile Equipment Identity (IMEI) number of the mobile device 110, which is unique to every mobile phone device. Other examples of device ID are possible. For example, the device ID may be derived from a phone number associated with the mobile device 110. If the identifier associated with user includes a device ID, the keyboard application 120 could be associated with a mobile network operator (a mobile network billing app, for example).

Once the message comprising the unique record ID (and other data returned by the server 150 from the database 160) has been received by the keyboard interceptor 140, the keyboard interceptor 140 associates an element in the GUI with the unique record ID. For example, the keyboard interceptor 140 may display, within a user interface of the keyboard application 120, a dedicated element in the GUI. The GUI element serves to notify the user that data has been found that is relevant to what the user entered (in this example, "jon"). The dedicated GUI element may take the form of a button, text, icon, and other interactive elements. Selection of this GUI element may involve the user physically pressing on a region of a display of the mobile device 110 that is presently displaying the GUI element. Alternatively, or in addition, the keyboard interceptor 140 may associate one or more GUI elements already present in the user interface of the keyboard application 120 with the message. For example, when the message is received from the server 150 indicating that data has been located that is relevant to the search query, the keyboard interceptor 140 may associate an enter button, displayed in the user interface of the keyboard application 120, with the unique record ID.

The GUI element associated with the unique record ID may display an indication that one or more deals for the brand associated with the data are available to the user. The indication may be text notifying that one or more coupon codes are available to use on a website associated with the brand. In one example, the indication includes text stating a number of coupon codes that are available. In another example, the indication may be text notifying that one or more surveys are available for this brand. Metadata relating to the one or more surveys, located based on the search query, may also be displayed in association with the GUI element. This might indicate that the user may receive a reward for completion of the survey(s). This may further incentivise the user to visit the brand's website.

The unique record ID may be associated with a particular merchant, and the database 160 may further store a logo and an active deal associated with the merchant, together with keywords associated with the merchant and any other metadata that may assist in identifying the merchant. The logo associated with the merchant and text indicating the active deal may be included with the unique record ID in the message returned by the server 150 to the keyboard interceptor 140. In this example the logo may be displayed within the GUI element.

In another example, the GUI element may include a further interactive element that allows a user to obtain further information on the located data. The further interactive element may be displayed within the GUI element. For example, the further interactive element may be displayed as an "i" positioned within the GUI element. A selection of the further interactive element may cause the display additional data associated with the brand, such as an indication of whether any coupon codes are available and/or that a survey is available for completion by the user. The indication of available coupon codes may include one or more of the coupon code itself, the deal associated with the coupon code, and text asking whether the user would like to copy the code and proceed to a website associated with the brand. The indication of an available survey may include a title of the survey as well as the reward available for completion of the survey.

The result of the selection of the further interactive element may result in the display of one or more further GUI elements. The one or more further GUI elements may be displayed above the GUI element, and themselves display the additional data associated with the brand. Each further GUI element may correspond to a separate coupon code, and therefore may display the additional data such as the coupon code itself and the deal associated with use of the coupon code.

When the user selects the GUI element, the keyboard interceptor 140 receives a second input corresponding to selection of the GUI element. It is to be understood that selection of the GUI element is an input that is second to, which is to say that it follows, what is provided in order to seed the initial search query (in this example "jon").

Selection of the GUI element causes the keyboard interceptor 140 to take one or more actions. The one or more actions may include passing a coupon code associated with the located data into a text field within an application executing on the mobile device 110. The application may be any application that accepts coupon codes. Examples of such an application include a web browser application and an application associated with a merchant. The relevant text field may be a text field designated for coupon codes. An example is an HTML field specifically designated to receive text in the form of a voucher code. The one or more actions may include displaying a survey to the user relating to a brand associated with the located data.

The keyboard interceptor 140 may, responsive to the second input, send a request to the server 150 comprising the unique record ID, so that the server 150 can identify the database record(s) for which data was previously retrieved and returned to the keyboard interceptor 140 in response to the search query.

In response, the server 150 may retrieve the unique record ID from the message and search the database 160 for further information associated with the unique record ID. For example, if the coupon codes and/or survey questions were not previously communicated to the keyboard interceptor 140, the server 150 may now locate the coupon codes and/or survey questions using the unique record ID and communicate them back to the keyboard interceptor 140 for insertion/display.

When the one or more actions include placing a coupon code in a text field within an application, the selection of the GUI element may alternatively, or in addition, cause the available coupon code(s) to be stored so that they are accessible to the keyboard interceptor 140. The coupon codes may be stored locally, for example in a clipboard, local storage or in cache, and/or by the server 150. The clipboard may be a feature of the keyboard application 120 and/or a service of the operating system of the mobile device 110. In this case, when the user is accessing the application, the coupon code is available to the user to insert into the relevant text field (e.g. a coupon code field). The coupon code may be displayed within the user interface of the keyboard application 120, and be pasted into a desired text field following selection by the user. When the application is a web browser application, as a user is browsing a website associated with the URL, the keyboard interceptor 140 may detect that the user has selected a text field within the current webpage and cause the available coupon code(s) to be displayed within the user interface of the keyboard application 120 for selection by the user. Furthermore, the keyboard interceptor 140 may detect the type of text field currently being selected before causing the coupon code(s) to be displayed. In particular, the keyboard interceptor 140 may determine that the selected text field is a text field designated for coupon codes. The detection of a text field designated for coupon codes will be discussed further in relation to FIG. 8 below.

When the one or more actions include displaying a survey, the survey questions of the survey may be displayed in the region of the user interface of the mobile device 110 directly above the user interface of the keyboard application 120. Alternatively, the survey may be displayed in the user interface of the keyboard application 120 so that it overlays at least one portion of the keyboard. In a further example, the survey is displayed so that it substantially fills the GUI of the mobile device.

A user may complete the survey by directly answering the survey questions using the keyboard interceptor 140/keyboard application 120. The user may give answers in any format, such as text, images, video and audio. For example, a survey may request a user takes a photograph of a recent purchase for proof of purchase etc. The user may then input a photograph of their purchase into the survey. The photograph may be selected from a Gallery app on the mobile device 110. Alternatively, the keyboard interceptor 140 may activate a camera app operating on the mobile device 110 to allow the user to take the photograph. Once the user has taken the photograph, it is input by the keyboard interceptor 140 as an answer to the question in the survey.

A new entry may be created in the database 160 following the user's completion of the survey. The new entry may comprise at least one of the identifier associated with the selection of the GUI, the user's answers to the survey questions, a survey identifier, a user identifier, and the record identifier. Data in the new database entry can be communicated to the merchant associated with the survey so that the merchant can provide a reward to an entity associated with the database 160. The merchant may send back to the entity associated with the database 160 a list of rewards for completion of surveys by respective users. The list may further include the identifiers associated with the selection of the user's respective GUI elements. The entity associated with the database 160 can then credit the user with a proportion of the reward. The user can be identified by querying the database for the identifier associated with the selection of the GUI and the user identifier. This process ensures that none of the user's personal information is communicated between the merchant and the server 150, while still allowing the tracking of user activity.

In some examples, in addition to a coupon code and/or survey questions, the data associated with the unique record ID may further comprise a redirect URL for a website associated with the unique record ID. In this case, the server 150 may generate a unique tracking link, which comprises a randomly generated click ID and the redirect URL. The unique tracking link optionally additionally comprises parameters such as an Urchin Tracking module (UTM) parameter that provides tracking statistics for the redirect URL. Other types of information, such as a server identifier that identifies the server 150, may be included in the unique tracking link. The server identifier allows for any actions taken by the user on the website associated with the domain name to be attributed to the server 150 generating the unique tracking link that sent the user to the website.

The unique tracking link can then be stored in the database 160 in association with the unique record ID and an identifier for the user and sent back to the keyboard interceptor 140 as e.g. an HTTP message. The keyboard interceptor 140 may pass the unique tracking link to a web browser application executing on the mobile device 110. The unique tracking link may be automatically placed into an address bar of the web browser application, thus, effectively, directing the user to the website following a single click of a GUI element. Alternatively, the unique tracking link may be inserted into the address bar, giving the user the option to follow the link, or to select a different link. Accessing the website causes the web browser application to store a cookie generated by the website. The cookie comprises the click ID which as described above is present in the unique tracking link. The cookie provides the owner of the website the capability to monitor the user's activity while the user browses the web site.

In another example, the keyboard interceptor 140 may pass the unique tracking link to a new tab of the web browser application. The keyboard interceptor 140 may cause a new tab to be opened within the web browser application so that the cookie can be stored when the new tab is opened. The keyboard interceptor 140 may then cause the new tab to be closed when the cookie has been stored. This process allows the cookie to be stored without the user being directed away from a current webpage. In another example, keyboard interceptor 140 refreshes the current webpage using the unique tracking link.

Any actions taken by the user after selecting the GUI element can be attributed to that user by reading the click ID associated with the unique tracking link. When the unique tracking link further comprises a server identifier, an entity associated with the tracking link can provide the server 150 associated with the server identifier an indication of the action taken by the user. The server 150 then compares the unique tracking link received from the entity and the stored unique tracking links. Because the click ID portions of the link will match, the server 150 can then attribute the action to a particular user. Advantageously, the form of the unique tracking link is secure because it does not contain any user information. Therefore, a third party who snoops on the user as they browse the website associated with the unique tracking link will not be able to associate the actions taken by the user with any individual.

When the one or more actions include displaying a survey and generating a unique tracking link, once the website associated with the unique tracking link is accessed via the web browser application, the keyboard interceptor 140 may cause questions in a survey associated with the GUI element to be displayed within the user interface of the keyboard application 120. In this way the user can complete the survey independently of making any purchases on the website. In another example, the keyboard interceptor 140 causes the display of the survey after a user has completed a purchase on the website. In yet another example, the keyboard interceptor 140 causes the display of the survey when it is determined that the user has navigated away from the website. The decision of when to display the survey to the user may be based on the content of the survey and determined according to rules set by a third party such as the provider of the keyboard interceptor 140 and/or the merchant. For example, a survey may relate to a user's experience of browsing the merchant's website. In this case, the survey may be displayed following a determination that the user has navigated away from the web site.

In a related example, when data relating to one or more surveys is located, selection of the GUI element causes a unique tracking link to be generated, but does not cause the keyboard interceptor 140 to request data relating to a survey. Instead, as the user is browsing the website associated with the unique tracking link, the keyboard interceptor 140 may cause an indication that one or more surveys are available for the website to be displayed within the user interface of the keyboard application 120. The indication may include one or more selectable GUI elements. Upon selection of a selectable GUI element, the keyboard interceptor 140 may send a request for data relating to the located one or more surveys, or may retrieve data relating to the one or more surveys that was stored previously. In response to the selection of the selectable GUI element, the keyboard interceptor 140 may cause one or more further GUI elements to be displayed in the user interface of the keyboard application 120. Each of the further GUI elements is associated with a survey and may display metadata relating to the survey. Selection of one of the further GUI elements causes questions relating to the selected survey to be displayed. In this case, the user may decide to complete a survey only after they have arrived at the website.

The system 100 described above provides replicated functionality of desktop web browser extensions for mobile devices by means of a keyboard interceptor 140. The system 100 provides a convenient search for coupon codes and/or surveys based on input either entered by the user or based on current content being accessed on the mobile device 110.

FIG. 2 illustrates schematically a mobile device 200 according to a further example. The mobile device 200 may be the same mobile device 110 of the system 100 shown in FIG. 1. The mobile device 200 is a mobile computing device that supports a mobile operating system. Example mobile devices include an iPhone® running iOS® 15 or above, the mobile operating system developed by Apple Inc. of Cupertino, United States. Other example mobile devices include mobile computing devices running the Android™ operating system developed by Google LLC of Mountain View, United States.

The mobile device 200 comprises a network interface 210, a keyboard application 220, a web browser application 250, a web browser extension 255 associated with the web browser application 250, a graphical user interface (GUI) 260, a processor 270, storage 280, and an accessibility service 290. The keyboard application 220 comprises a keyboard SDK 230 and a keyboard interceptor 240. The user interface 260 may be a touch sensitive display. The keyboard SDK 230 provides the keyboard application 220 with virtual keyboard functionality that is displayed on the GUI 260 and allows the user to provide input to the mobile device 200. The processor 270 is configured to cause the keyboard interceptor 240 to execute certain instructions.

Figure 3:
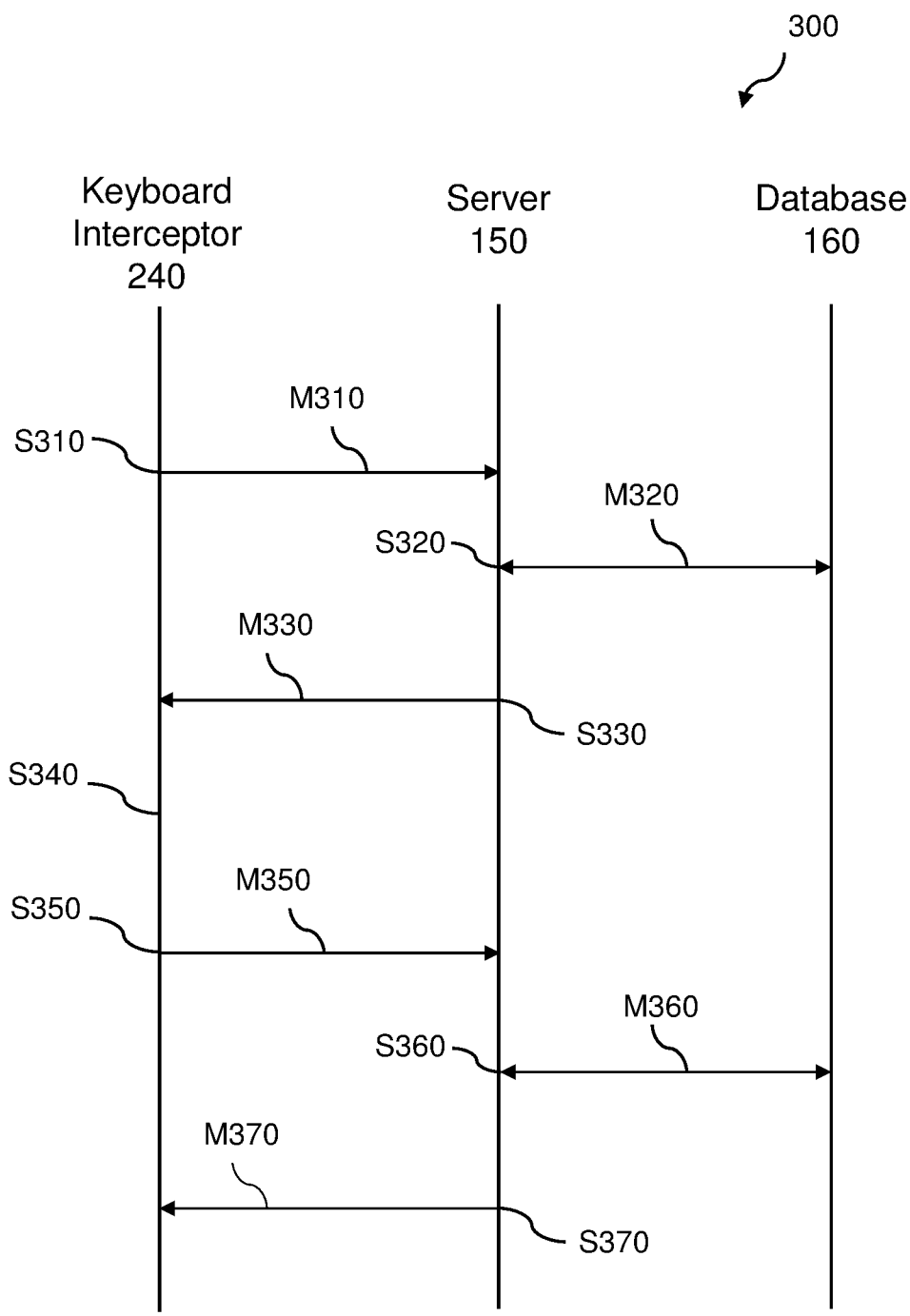
FIG. 3 shows a flow diagram illustrating a process flow according to an example.

As has been described with respect to the system 100, the keyboard interceptor 240 may track inputs entered by a user or receive information from one or more applications present on the mobile device 200 (such as the web browser extension 255 and the accessibility service 290). FIG. 3 is a process flow diagram illustrating the communication flow 300 between the keyboard interceptor 240, the server 150 and the database 160 according to an example implementation. At step S310, the keyboard interceptor 240 has received a first input.

In a first example, this input may be received via an event listener of the keyboard interceptor 240 as a user interacts with an application on the mobile device 200 using the keyboard application 220, as has been described above.

In a second example, the keyboard interceptor 240 includes a search bar. The search bar may be displayed whenever the keyboard application 220 is executing, or may be displayed by selecting an option within the user interface of the keyboard application 220. The search bar provides a means by which the user can directly interact with the server 150. The search bar may accept typed input using the virtual keyboard provided by the keyboard application 220 and/or accept voice input. For example, the search bar may include a selectable icon that activates a microphone of the mobile device 200 and records an audio clip. The keyboard interceptor 240 may use speech to text processing to convert any speech in the audio clip to text.

In a third example, the keyboard interceptor 240 is configured to monitor current content of a user interface of the mobile device 200. In one case, a current application being accessed is the web browser application 250 and the keyboard interceptor 240 obtains the URL of a webpage of a website currently being accessed by the web browser application 250 from the current content. The current content may be obtained by taking a screenshot of the user interface of the mobile device 200 by the keyboard interceptor 240. The keyboard interceptor 240 may then perform image processing on the screenshot to determine the URL in the address bar of the mobile web browser application 250. In some instances, the full URL may be hidden in the address bar or the address bar itself may be hidden. The keyboard interceptor 240 may therefore take screenshots at a sufficient rate to obtain the URL between the instances where the full URL is hidden. The current content of the user interface may be obtained via the accessibility service 290 made available to the keyboard interceptor 240 by the operating system of the mobile device 200. The accessibility service 290 may be provided by the operating system of the mobile device 200 and comprise an autofill framework. The keyboard interceptor 240 may process the current content of the user interface obtained via the accessibility services to determine the URL of the current website.

In a fourth example, the keyboard interceptor 240 may interface with the web browser extension, or simply browser extension 255, associated with the web browser application 250 to determine a domain name associated with a webpage currently being accessed by the web browser application 250. Some mobile web browser applications 250 support browser extensions 255 in a similar manner to desktop web browser applications. For example, iOS® 15 has introduced the availability of browser extensions on the mobile version of Safari®. The browser extension 255 may be downloadable from an application repository compatible with the operating system running on the mobile device 200. Alternatively, or in addition, the browser extension 255 may be downloadable from within the web browser application 250. In another example, the browser extension may be provided pre-installed on the mobile device 200.

The browser extension 255 may interface with the keyboard interceptor 240. In one example, the keyboard interceptor 240 registers with the browser extension 255 to allow communication between the browser extension 255 and the keyboard interceptor 240. Further, the keyboard interceptor 240 and browser extension 255 may be provided by the same entity and so the user may be able to login to the same account associated with the keyboard interceptor 240 and the browser extension 255. The login procedure may be performed via a single sign-on process, such as OAuth 2.0 or SAML, for example.

The communication between the browser extension 255 and the keyboard interceptor 240 may be via an API providing direct communication on the mobile device 200. Alternatively, or additionally, the browser extension 255 and the keyboard interceptor 240 may communicate through shared storage, such as the storage 280, wherein the browser extension 255 may store data within the shared storage that is accessible to the keyboard interceptor 240. Alternatively, or additionally, the browser extension 255 and the keyboard interceptor 240 may communicate through the server 150. This may be possible because the browser extension 255 and keyboard interceptor 240 may be provided by the same entity that is also associated with the server 150.

The browser extension 255 can then send the URL to the keyboard interceptor 240 either: directly via an API, via shared storage whereby the browser extension stores the URL and the keyboard interceptor 240 accesses the shared storage to retrieve the URL, or indirectly through the server 150. The keyboard interceptor 240 may perform further processing on the URL to form the first input. For example, the keyboard interceptor 240 may extract text from the URL to form the first input.

Irrespective of how the first input is received/generated, the keyboard interceptor 240 generates a search query associated with the first input. The search query is forwarded to the server 150 via an API call M310. The API call M310 may be a "GET" HTTP request comprising the search query. As discussed above, authenticated communication between the server 150 and the keyboard interceptor 240 may be achieved via an authentication process whereby the server 150 provides one or more authentication tokens to the keyboard interceptor 240. The authentication tokens may include information about the user of the keyboard interceptor 240, such as a device ID.

As explained above, the data to be located includes at least one of a coupon code and a survey. The data may relate to a brand and may also include one or more of URLs, metadata such as offers, keywords, categories and, descriptions, and media etc. of that brand. The metadata may include an indication of whether there are any active deals available to the user. As discussed above, associated data can be linked via a unique record identifier (ID), which is generated by the server 150.

The mobile device 200 can communicate with the server 150 via the network interface 210. The network interface 210 may be a wireless interface arranged to facilitate a data flow between the mobile device 200 and the server 150. The network interface 210 may further facilitate a data flow between the mobile device 200 and other remote devices, such as one or more additional servers and other mobile devices connected to the same communications network. For example, the network interface 210 may communicate with remote devices in accordance with a communication protocol. The communication protocol may be any wireless standards including IEEE 802.11a, 802.11b, 802.11g, 802.11n, or 802.15. When the network interface is a wireless interface, the network interface may include one or more radios.

At step S320, the server 150 sends a request M320 to the database 160. The request M320 causes the database to locate data matching the search query. The request M320 may be a Structured Query Language (SQL) query. The request M320 causes the database 160 to search across all database entries for data matching the search query. This may involve communicating with an external service, such as the Azure™ search service.

At step S330, the server 150 sends the unique record ID in a message M330 to the keyboard interceptor 240. The message M330 may be an HTTP message. The message M330 indicates to the keyboard interceptor 240 that data matching the search query has been found.

At step S340, in response to receiving the message M330, the keyboard interceptor 240 associates, within a user interface of the keyboard application 220, a GUI element with the unique record ID. When the keyboard application 220 is a virtual keyboard, the GUI element may be a new GUI element that is displayed in a banner directly above the user interface of the keyboard in response to receiving the message M330. The GUI element may alternatively be a character key within the virtual keyboard.

At step S350, the keyboard interceptor 240 receives the second input corresponding to the user selecting the GUI element. In response, the keyboard interceptor 240 sends a request M340 to the server 150 comprising the unique record ID. The request M350 may be an HTTP "POST" request. The request M350 may be authenticated using any authentication tokens that were retrieved as part of the authentication process described above.

At step S360, the server 150 retrieves information associated with unique record ID by sending a further request M360 to the database 160. The request M360 may be an SQL query. The unique record ID allows the server 150 to identify the database record(s) for which data was previously retrieved via the request M320. In this example the information may comprises a coupon code and/or one or more survey questions.

At step S370, the server 150 sends data to the keyboard interceptor 240 via a further message M370. The further message M370 may be an HTTP message, as discussed above. The data comprises the located coupon and/or the one or more survey questions.

The keyboard interceptor 240 can then take one or more actions. When the data received in the further message M370 comprises a coupon, the one or more actions may include passing the coupon code associated with the located data into a text field within an application executing on the mobile device 200. When the data received in the further message M370 comprises one or more survey questions, the one or more actions may comprise displaying the one or more survey questions in the GUI of the mobile device 200.

When the data received in the further message M370 further comprises a unique tracking link, the unique tracking link may be passed to a web browser application 250. When launched, the unique tracking link provides access to the website corresponding to the URL. Accessing the website causes the web browser application 250 to store a cookie generated by the website. The cookie comprises the click ID which as described above is present in the unique tracking link. The cookie provides the owner of the website the capability to monitor the user's activity while the user browses the website. While the website associated with the unique tracking link is being accessed by the web browser application 250, the coupon code and/or survey questions may be made available by the keyboard interceptor 240 as has been described above.

It is understood that the coupon code and/or survey questions may be provided to the keyboard interceptor 240 in the message M330 at step S330, along with the unique record ID. In this case, in response to the second input, the keyboard interceptor 240 may pass the coupon code to the text field and/or display the survey questions without the need for further communication with the server 150. That is, steps S360 and S370 may be omitted in some embodiments. In the scenario wherein a web browser extension 255 is present, it is understood that passing the coupon code to the text field within a web browser application may be performed by the web browser extension 255. For example, the keyboard interceptor 240 may cause the web browser extension to pass the coupon code into the text field responsive to the selection of the GUI element. The keyboard interceptor 240 may communicate the coupon code to the web browser extension 255 if the coupon code was previously received from the server. In another example, the keyboard interceptor 240 causes the web browser extension 255 to interact with the server to obtain the coupon code and pass the coupon code into the text field.

In a second example implementation, the keyboard interceptor 240 communicates with local storage via the keyboard application 220 in order to locate the data. In this second example, data, similar to that stored by the database 160 in the first example, may be stored locally in the storage 280. In this case, there may be an initial replication process between the database 160 and the local storage 280, whereby the data stored in the database 160 is copied to the local storage 280. The keyboard application 220 preferably regularly communicates with the server 150 to refresh the data stored locally.

In this second example, the keyboard interceptor 240 receives input and generates a search query. To locate data, the search query is passed to the keyboard application 220. The keyboard application 220 can then perform a search of the local storage 280 to locate data matching the search query. Locating the data may involve an intermediate step of retrieving the data from cache. For example, the data may already be cached in a separate memory (not shown) and so already available to the keyboard application 220, or the data may be located in the storage 280 first and cached into the separate memory before being retrieved by the keyboard application 220. The message, comprising the record identifier, and indicating that the data has been located that matches the search query, is then passed from the keyboard application 220 to the keyboard interceptor 240, causing a GUI element displayed by the keyboard application 220 to be associated with the message. Accessing local storage instead of communicating with a remote server may speed up the process of locating data matching the search query. In this second example, when the user selects the GUI element, the keyboard interceptor 240 forwards a request to the keyboard application 220 that comprises the unique record ID. The keyboard application 220 can then forward the request to the server for data associated with the unique record ID.

Figure 4:
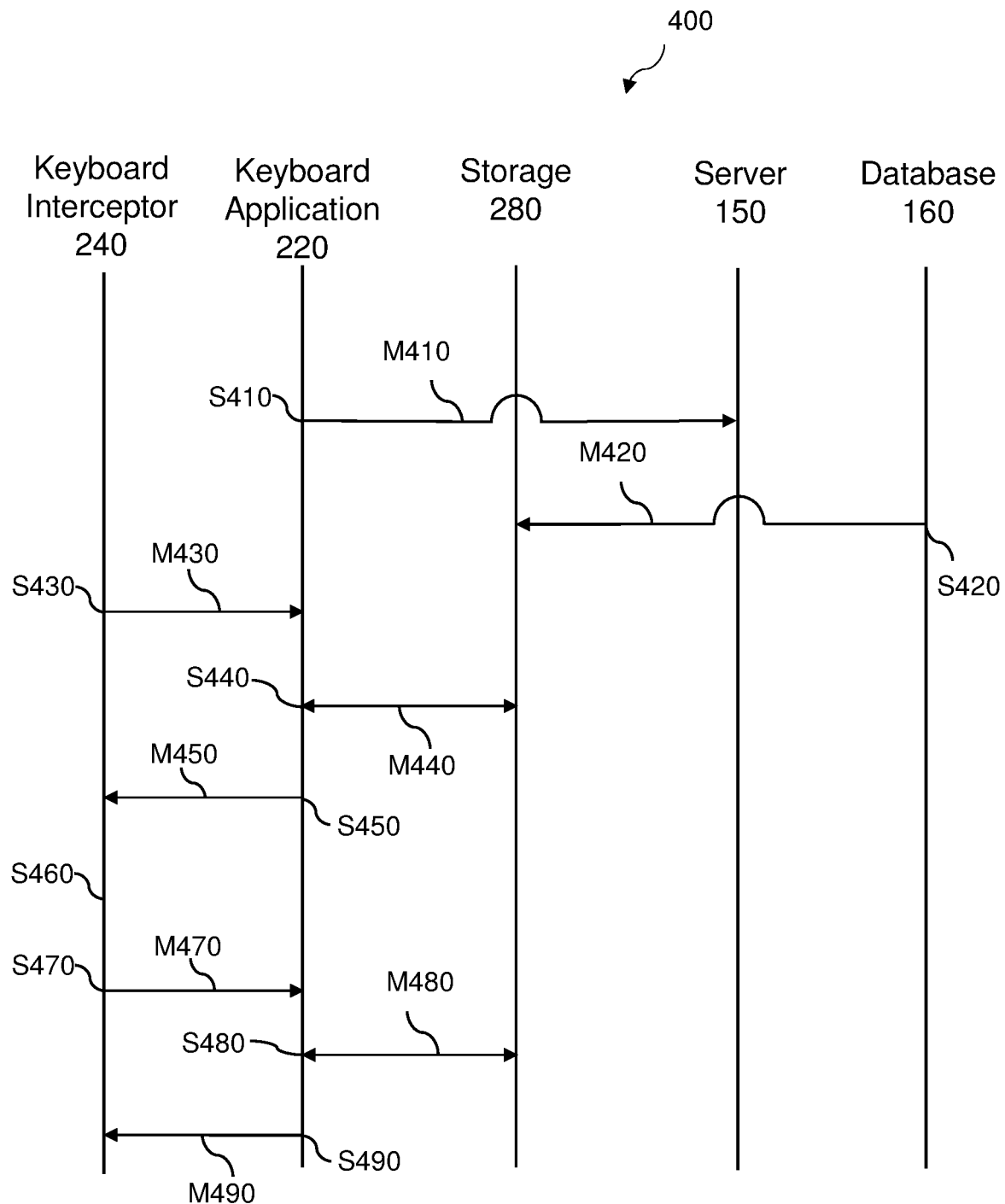
FIG. 4 shows a flow diagram illustrating a process flow according to a further example.

FIG. 4 shows a flow process diagram illustrating a communication flow 400 between the keyboard interceptor 240, the keyboard application 220, the server 150 and the database 160 according to the second example implementation. At step S410, the keyboard application 120 sends a request M410 to the server 150 requesting data stored in the database 160. This may occur as part of an initialisation process when the keyboard application 220 is first installed on the mobile device 200. In this instance, the user may be required to create, or login to, an account associated with the server 150. Said account may grant authorisation of the keyboard application 220 to communicate with the server 150.

At step S420, a data synchronisation process occurs wherein records stored on the database 160 are downloaded onto the storage 280 via a data transfer M420. The data synchronisation process may occur in response to the server 150 determining that the keyboard application 220 can validly communicate with the server 150. The data transfer may be a JavaScript™ Object Notation (JSON) data response. Once the data transfer M420 is completed, the records stored in the database 160 are now also present in the storage 280.

At step S430, the keyboard interceptor 240 receives a first input and generates a search query based on the first input. The keyboard interceptor 240 sends a request M430 comprising the search query to the keyboard application 220. The request M430 may be an API call between the keyboard interceptor 240 and the keyboard application 220.

At step S440, the keyboard application 220 communicates with the local storage 280 in order to locate data that matches the search query. The data includes at least one of a coupon code and a survey. The keyboard application 220 sends a request M440 to the storage requesting data that matches the search query. When data matching the search query is located, the unique record ID associated with the data is retrieved. Locating the data may involve the intermediate step of retrieving the data from cache.

At step S450, after data has been located, the keyboard application 220 sends a message M450 to the keyboard interceptor 240 comprising the unique record ID. The keyboard interceptor 240 then associates a GUI element in the user interface of the keyboard application 220 with the unique record ID.

At step S460, the keyboard interceptor 240 associates, within a user interface of the keyboard application 220, a GUI element with the unique record ID in response to receiving the message M450.

At step S470, the keyboard interceptor 240 receives a second input corresponding to the selection of the GUI element. In response to the second input, the keyboard interceptor 240 sends a request M470 to the keyboard application 220 comprising the unique record ID.

At step S480, the keyboard application 220 sends a further request M480 of the local storage 280 for information associated with the unique record ID. The unique record ID allows the keyboard application 220 to identify the record(s) for which data was previously retrieved via the request M440.

At step S490, the keyboard application 220 sends the coupon code and/or survey associated with the unique record ID to the keyboard interceptor 240 via a further message M490.

As discussed above with regards to FIG. 3, the coupon code and/or survey questions may be provided to the keyboard interceptor 240 in the message M450 at step S450, along with the unique record ID. In this case, in response to the second input, the keyboard interceptor 240 may pass the coupon code to the text field and/or display the survey questions without the need for further communication with the server 150. That is, steps S480 and S490 may be omitted.

In a third example implementation using the mobile device 200, the keyboard interceptor 240 receives an input and generates a search query. As in the second example, the search query is passed to the keyboard application 220. In this third example, the keyboard application 220 makes an API call to a server to locate data matching the search query. The API call is similar to the API call M310, but is instead between the keyboard application 220 and the server 150. To this end, the keyboard application 220 may further comprise the necessary API functionality required to communicate with the server 150, in which case the keyboard application 220 may itself send the search query to the server 150 to locate the data. When the data is located, the message comprising the unique record ID is returned to the keyboard application 220 and delivered to the keyboard interceptor 240. The keyboard interceptor 240 then associates, within a user interface of the keyboard application 220, a GUI element with the message. In this third example, when the user selects the GUI element, the keyboard interceptor 240 makes an API call to the keyboard application 220, causing the keyboard application 220 to itself generate an API call to the server 150 for the information associated with the record ID. As for the other examples, this API call may be sent as an HTTP "GET" request to the server 150.

In a fourth example implementation using the mobile device 200, the keyboard interceptor 240 receives the input entered by the user from the keyboard application 220 and generates a search query. As in the second and third examples, the search query is passed to the keyboard application 220. The keyboard application 220 then performs a search of the local storage 280 to locate data matching the search query. If data relevant to the search request is not found by the keyboard application 220, the search query is then forwarded to the server 150 via an API call, similar to the API call M310, but between the keyboard application 220 and the server 150. This might occur if relevant data is not present in the local storage 280 but is available to the server 150, because the data available to the server 150 may be more up to date.

In some examples, input may be provided via one or more fields of the user interface. Example field types include a URL field, a password field, text field, and a numerical field. The keyboard interceptor 240 may determine that the field into which the first input is provided is a field that is designated for coupon codes. The detection of a text field by the keyboard interceptor 240 may cause a selectable element to be displayed in the user interface of the keyboard application 220. The selectable element may indicate that one or more coupon codes are available for use on the current website. Selection by the user of the selectable element may then cause the one or more coupons to be displayed to the user for insertion into a relevant text field.

Some mobile operating systems, web browser applications or websites may not define a specific coupon code text field. The keyboard interceptor 240 may then cause the display of the coupon codes whenever the selection of a generic text field is detected. In such cases (when a specific coupon code field is not defined) certain defined text fields that are defined may be filtered out, such as password, email, address, and browser bar fields. By eliminating these defined, and non-coupon, fields, it becomes more likely that the remaining, non-defined, fields are for coupon code(s). This filtering may occur when a user is currently within a web browser application 250.

Figure 5A:
FIG. 5A illustrates a display on a mobile device according to an example.
Figure 5B:
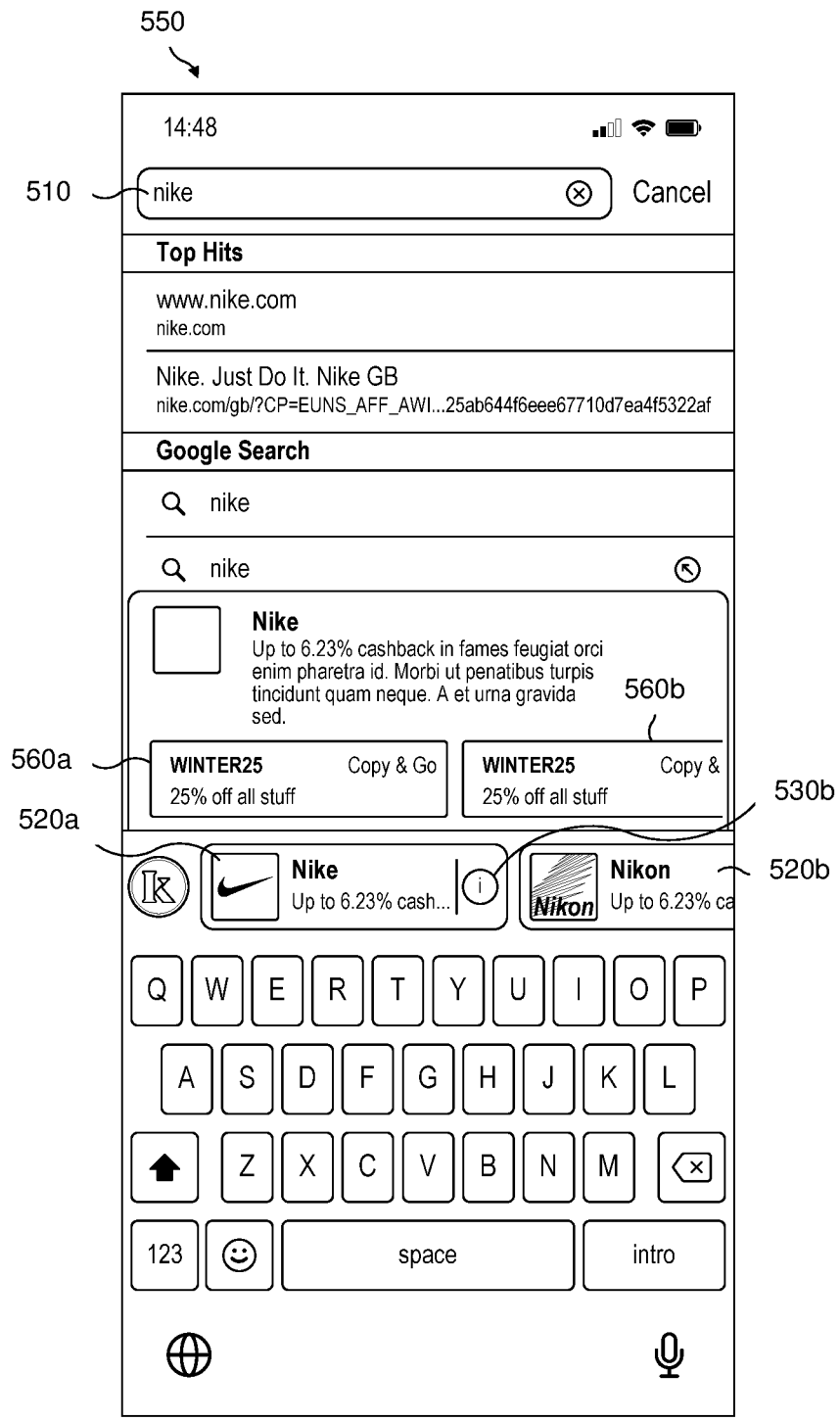
FIG. 5B illustrates the display on the mobile device according to a further example.

FIGS. 5A and 5B show example user interfaces 500, 550 of a mobile device in which one or more coupon codes are sourced based on input provided by a user. FIG. 5A shows an example where a user has typed into an address bar 510 of a mobile web browser application, such as the web browser application 250. In particular, the user has typed "nike" and the keyboard interceptor has formed a search query which has located data relating to the brands Nike® and Nikon®. Metadata associated with Nike® and Nikon® is displayed in selectable GUI elements 520a, 520b within the user interface of the keyboard application. In this example, the GUI element associated with Nike® includes an interactive element 530, here shown as an "i".

In FIG. 5B, the user has selected the further interactive element 530. The keyboard interceptor has made a call to request data associated with the brand Nike®, either from local storage on the mobile device, or from the database 160. In response to retrieving the data, the keyboard interceptor 240 has caused the display of further data associated with the brand Nike®. There are at least two coupon codes stored in a record associated with the brand Nike® in the database 160. Data relating to the two coupon codes is displayed above the keyboard within two further selectable GUI elements 560a, 560b. The data displayed includes the coupon code itself, text indicating the discount associated with use of the coupon code and text indicating that the user can select the coupon code, be directed to the Nike® website and that the coupon code will be stored for pasting in a relevant text field on the website. The user may then either: select one of the GUI elements 560a, 560b displaying a coupon code which will cause a unique tracking link to be generated and copy the selected coupon code for later use; or, select the GUI element 520a that displays the brand name which will cause a unique tracking link to be generated without copying a coupon code. If the user selects the GUI element 520a that displays the brand name, the keyboard interceptor 240 may store the coupon codes for later use.

Figure 6A:
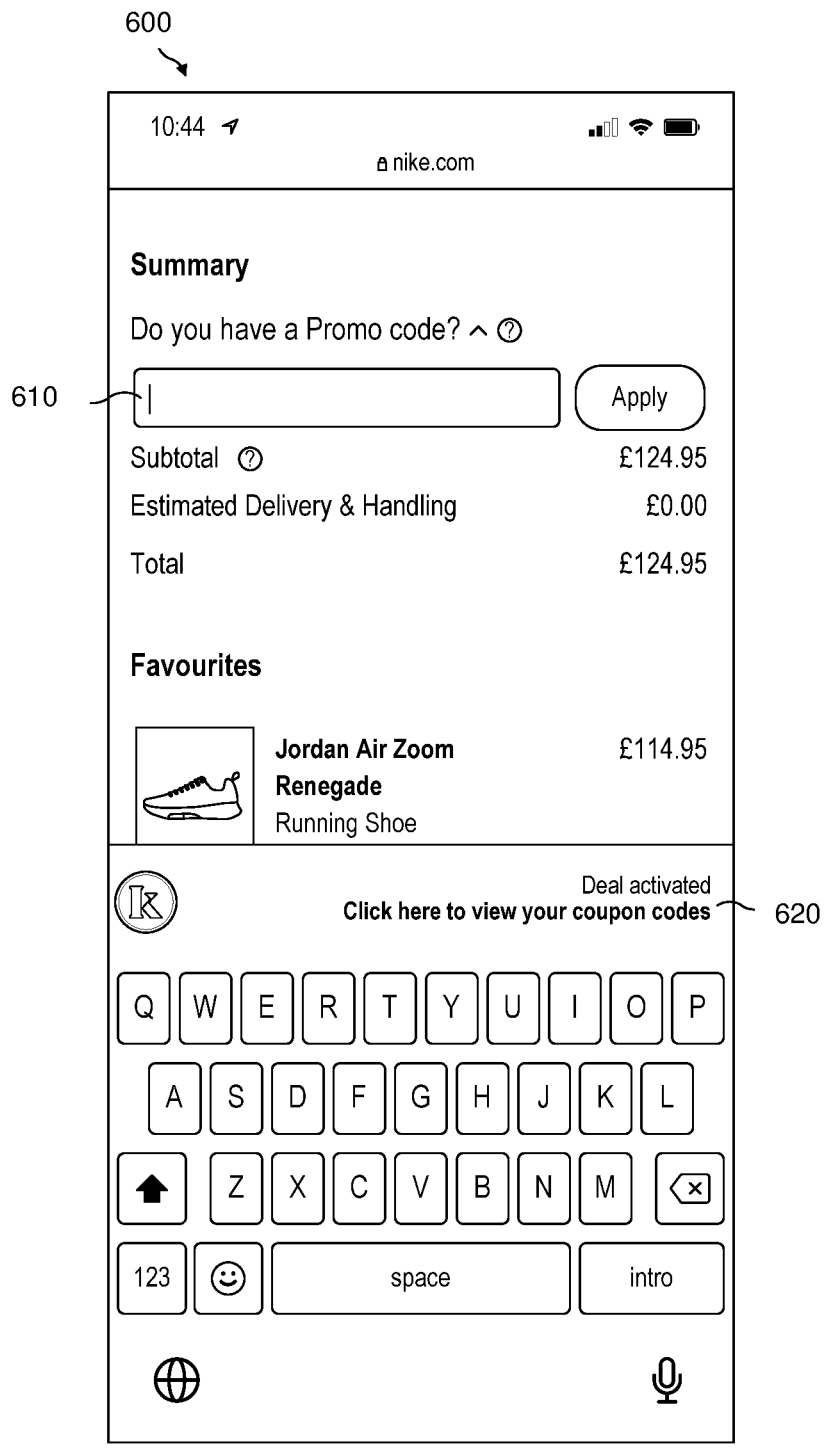
FIG. 6A illustrates a display on a mobile device according to yet a further example.
Figure 6B:
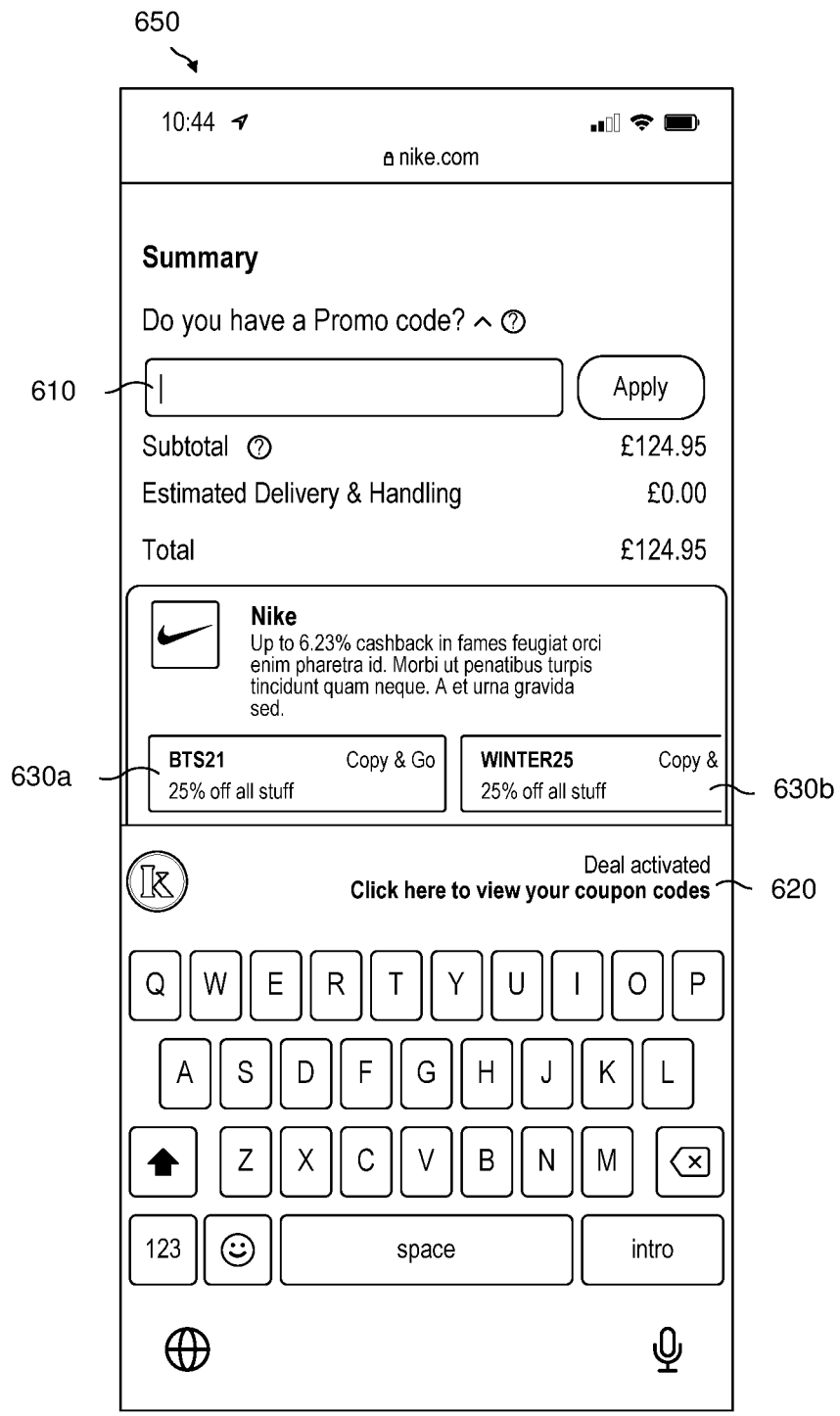
FIG. 6B illustrates a display on a mobile device according to yet a further example.
Figure 7:
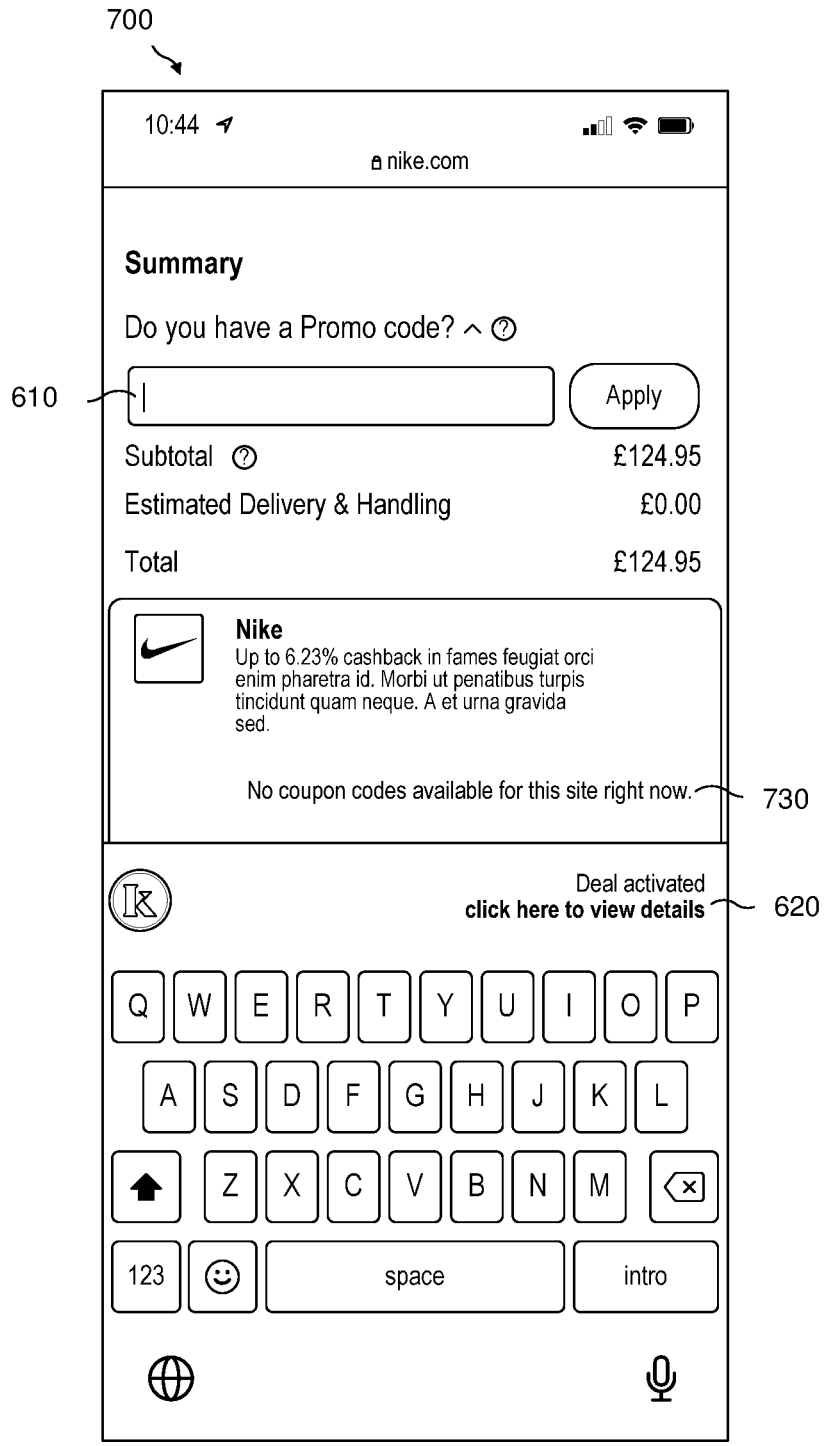
FIG. 7 illustrates a display on a mobile device according to yet a further example.

FIGS. 6A, 6B and 7 show further example user interfaces 600, 650, 700 of a mobile device in which a user wishes to make a purchase via a website. In FIGS. 6A, 6B and 7, the browser has navigated to the current website on the user's mobile device. In FIG. 6A, the user has selected a coupon code text field 610. The keyboard interceptor has received current content of the user interface 600 using any of the methods described above (by analysing a screenshot of the user interface or receiving a URL from a web browser extension associated with the web browser application etc.). The keyboard interceptor has then generated a search query which has located one or more coupons for use on the current website. In this example, selection of a coupon code field 610 has been detected by the keyboard interceptor. In response to detecting selection of the coupon code field 610, the keyboard interceptor has caused the display of an indication that one or more coupon codes are available for this brand. This indication is displayed as a selectable GUI element 620 within the user interface of the keyboard application.

FIG. 6B continues the example shown in FIG. 6A, wherein the user has selected the selectable GUI element 620. In response to detecting selection of the selectable GUI element 620, the keyboard interceptor has retrieved previously located coupon codes and corresponding metadata relating to said codes, and has caused the user interface to display two further GUI elements 630a, 630b. The two further GUI elements 630a, 630b each display the coupon codes, the deal associated with use of the coupon codes, and a suggestion for the user to select one of these GUI elements 630a, 630b. Selection of one of the further GUI elements 630a, 630b will cause the coupon code associated with whichever GUI element was selected to be inserted into the coupon code field 610.

FIG. 7 shows a further example related to the example shown in FIGS. 6A and 6B, wherein, on selection of the selectable GUI element 720, the keyboard interceptor has not located any coupon codes. Correspondingly, the user interface of the keyboard application is now displaying a notification 730 that no coupon codes have been found.

Figure 8:
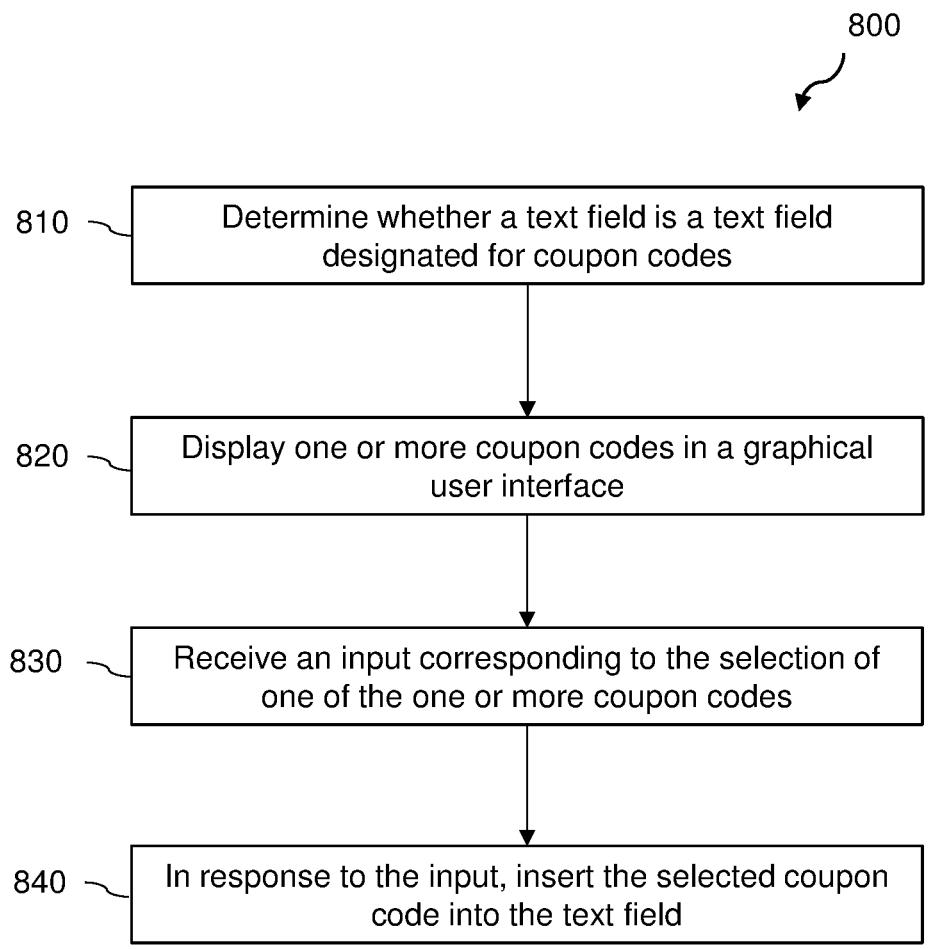
FIG. 8 is a flow chart of a method according to a further example.

FIG. 8 shows an example method 800 in which a keyboard interceptor is used to insert a coupon code into a coupon code field, similar to what is being shown in FIGS. 5A and 5B.

At block 810, the method 800 involves determining whether a text field in an application executing on a mobile device is a text field designated for coupon codes. As discussed above, the application may be a web browser application or a merchant's app, amongst other examples. In a first example, the keyboard interceptor 240 may receive an indication that a user has selected a text field. The indication may involve determining that the keyboard is active and currently being displayed to a user, or may be based on the detection of an HTML element such as the <textarea> tag, for example. Responsive to a positive determination, the keyboard interceptor 240 obtains a screenshot of the graphical user interface (GUI) of the mobile device. The screenshot may then be analysed to determine that the selected text field is designated for coupon codes. The analysis may involve performing one or more image analysis techniques on the screenshot. For example, the analysis may involve determining that text relating to the use of coupon codes is located within a certain distance to the text field. Terms such as "coupon", "discount", "promo code" and "voucher" located close to a text field may indicate that the text field is a text field designated for coupon codes. Text in the screenshot can be obtained by a text recognition algorithm such as optical character recognition (OCR), and the location of a text field in relation to the text relating to the use of coupon codes may be determined via a shape recognition algorithm, for example. The analysis may be performed by the keyboard interceptor 240. Alternatively, the keyboard interceptor 240 communicates the screenshot to the server 150 so that the server 150 can perform the analysis. In this case, the server 150 sends a further communication to the keyboard interceptor 240 indicating whether a coupon code field is selected.

In a second example, the keyboard interceptor 240 uses an accessibility service 290 on the mobile device to determine whether a text field is designated for coupon codes. The accessibility service 290 may support an autofill framework that monitors the designation type of the text field to allow the automatic insertion of data relevant to the text field. In this case, the autofill framework determines that the user has selected a text field designated for coupon codes, and communicates this determination to the keyboard interceptor 240.

In a third example, the keyboard interceptor 240 communicates with the application directly to determine whether the text field is a text field designated for coupon codes. For example, the application may be a merchant's app which defines a coupon code field. An indication that the current text field is designated for coupon codes then may be communicated to the keyboard interceptor 240 via one or more APIs, for example.

In a fourth example, the application is a web browser application 250, and the keyboard interceptor 240 interfaces with a web browser extension 255 associated with the web browser application 250. In this fourth example, as a webpage is being accessed by the web browser application 255, the browser extension 255 may detect an HTML field within the webpage specifically designated to receive text in the form of a coupon code. The browser extension 255 may utilize a function that returns the input fields within the webpage, such as the "getElementsByTagName" function. The input fields may be narrowed down to only those designated for coupon codes via one or more functions, such as the "querySelectorAll" function. If the browser extension 255 determines that a text field has been selected, then the browser extension 255 communicates an indication of this to the keyboard interceptor 240.

At block 820, the method 800 involves displaying one or more coupon codes in the GUI of the mobile device 260. The keyboard interceptor 240 may at this point generate a search query for coupon codes by analysing the current content of the user interface 260 for a current URL, receive the URL from the browser extension 255 or receive an indication of the current application being accessed. In this case, the keyboard interceptor 240 may send the search query to the server 150 for the one or more coupon codes. The request may be an HTTP request. In another example, the keyboard interceptor 240 may have stored the one or more coupon codes previously when the user first accessed the application or current website, or when a unique tracking link was generated. The coupon codes may be stored locally in cache or in storage 280, for example. Once the one or more coupon codes are retrieved, the keyboard interceptor 240 causes the display of the coupon codes in the GUI of the mobile device, as discussed above.

At block 830, the method 800 involves receiving an input corresponding to the selection of the one or more coupon codes. The input signifies the user's intention to insert a coupon code corresponding to the selection.

At block 840, the method 800 involves, in response to the input, inserting the coupon code into the text field. As described above, the coupon code may be copied to a clipboard and then immediately pasted into the text field. Alternatively, the coupon code is directly inserted into the text field by the keyboard interceptor 240 from cache, following the retrieval of the coupon code.

In a related example, the autofill framework of the accessibility service 290 can be utilised to insert a coupon code into a text field designated for coupon codes without any input from the user. In this example, the autofill framework determines that the selected text field is designated for coupon codes and communicates this to the keyboard interceptor 240. The keyboard interceptor 240 may then retrieve coupon codes, either from storage or via a request to the server 150. The keyboard interceptor 240 and/or server 160 may automatically determine an appropriate coupon code to be inserted into the text field. The automatic determination may be made based on a discount amount for the purchase item, for example. Once the keyboard interceptor 240 has retrieved the appropriate coupon code, it communicates the code to the autofill framework. The autofill framework is then configured to automatically insert the code into the text field. In this way, as soon as a user selects a coupon code field, a coupon code is automatically sourced and inserted into the field.

Returning to the flow diagrams 300 and 400, the keyboard interceptor 240 may determine that the field into which the first input is provided is a field that is designated for URLs or searches, examples of which are text fields for search engines. In a further example, the keyboard interceptor 240 may determine that the field into which the first input is provided is neither designated for URLs nor searches. For example, the user may be composing a message addressed to a second user into a messenger application. The keyboard interceptor 240 may still be active and performing steps S310-S370 or S430-S490. In response to receiving a second input from the user corresponding to selection of the GUI element, the keyboard interceptor 240 may cause the web browser application 250 to be launched from the messenger application. The web browser application 250 may be a default web browser application.

The keyboard interceptor 240 may cooperate with any application running on the mobile device 200 in which the user can provide input via the keyboard application 220. The keyboard interceptor 240 may detect the current application into which the user is providing input. Based on this detection, the keyboard interceptor 240 may lookup a list of applications to, or otherwise, determine whether the current application is one that is enabled for use with the keyboard interceptor 240. The list may be stored in the local storage 280 and/or in the database 160. If the keyboard interceptor 240 determines that the current application is enabled for use, then steps S310-S370 or S430-S490 may be performed. In this case, the detection of the current application may feed into forming the search query. For example, the search query may include an indication that the user is currently accessing the current application. The server 150 may then return coupon codes and/or surveys that are specific to an entity associated with the current application.

On the other hand, if the keyboard interceptor 240 determines that the current application is not enabled for use, the keyboard interceptor 240 may become inactive and not perform steps S310-S370 or S430-S490. In an example, a particular mobile application may be considered to be not enabled if that mobile application is of a particular type or meets certain prespecified criteria such as being associated with data stored in the database 160. If the keyboard interceptor 240 remained active and data relating to a competitor is also stored in the database, then the user may be given an option between the brand and the competitor in their keyboard application 220.

In some examples, when the first input is provided by a user, the keyboard interceptor 240 will debounce the search, or wait, for a predetermined amount of time after the user has finished providing the first input before generating the search query. Such debouncing may increase the efficiency of the process by reducing the number of computations that need to be performed. The predetermined amount of time may be a fixed amount of time, such as 0.3 seconds. Alternatively, the predetermined amount of time may be dynamically determined. For example, the keyboard interceptor 240 may utilise a learning algorithm in order to determine an optimal amount of time to debounce the generation of the search query based on the user's usage patterns. In this case, the predetermined amount of time to debounce the generation of the search query for a slower typer may be longer than the predetermined amount of time to debounce the search for a quicker typer. For example, an optimal amount of time to debounce the search for a fast typer would result in unnecessary additional searches for a slower typer because searches may be performed after each key stroke by the slower typer. This may result in locating domain names that are not relevant to the text that will eventually be typed, using unnecessary computational resources to do so.

In a further example, the authentication tokens used by the server 150 that allow authenticated communication between the server 150, and the keyboard application 220 and/or the keyboard interceptor 240 include a device identifier. This is particularly beneficial when the keyboard application 220 is provided by a mobile network operator or other entity that provides goods and/or services in exchange for payment. In this case, a portion of commission rewarded to the user for use of a coupon or completion of a survey may be provided to user as money off or otherwise a discount of a future payment. For example, the keyboard application 220 may be a mobile network billing application associated with the mobile network operator. In this example the mobile network billing application comprises an SDK providing the keyboard functionality and a keyboard interceptor 240 described above. In this example, the keyboard interceptor 240, being part of the mobile network billing application, generates the device identifier and forwards it to the server 150. The server 150 may then return the authentication tokens that allows authenticated communication between the server 150 and the keyboard interceptor 240. In this case, the authentication tokens include the device identifier. The device identifier may be generated from at least one of: the IMEI number of the mobile device, and a phone number associated with the device. When the user subsequently makes a purchase on a merchant's website, that merchant will forward commission to the network operator. A portion of the commission can then be passed to the user e.g. as money off the user's next monthly data plan payment, or as credit where that user is on a pay as you go tariff. More generally, when the keyboard application 220 is provided by a third-party that provides goods/services in exchange for payment from the user, the merchant will forward commission to the third-party. A portion of this commission may then be passed to the user. For example, when the third-party provides a subscription service to the user, the portion of the commission passed to the user may be in the form of money off the user's next bill. In a further example, when the third-party is a goods provider, the portion of the commission passed to the user may be in the form of a voucher for money off a next purchase of said goods. In any case, the keyboard interceptor 240 generates the device identifier and forwards it to the server 150. The server 150 responsively returns authentication tokens allowing authenticated communication between the server 150 and the keyboard interceptor 240.

As mentioned above, it is contemplated that the search query may return a plurality of different records. This may occur if, for example, the input entered by the user is a general term for which there are many matching records. For example, the text "trainer" may be identified as a keyword in a record associated with the merchant Nike® and in a record associated with the merchant John Lewis®. In the case where the search query returns a plurality of different records, the keyboard interceptor 240 may associate a plurality of GUI elements on the user interface of the keyboard application 220 with the respective record identifiers. The user can then select one of the plurality of GUI elements which will cause the keyboard interceptor 240 to locate a coupon code or survey as described above.

The GUI elements associated with each record/merchant may be ordered according to one or more rules. For example, the order in which the GUI elements are displayed may be determined by an entity associated with the keyboard interceptor 240. In one case, the order of the GUI elements may correspond to a sustainability score associated with the respective merchants/brands. For example, brands determined to be more sustainable may be displayed first so that a user sees these brands first. This may make it more likely that the user selects the GUI element associated with these brands.

In a further example, the keyboard interceptor 240 may cause an icon to be displayed on the user interface of the keyboard application 220. The icon may signify to the user that the keyboard interceptor 240 is currently active and available to search for data when the user begins providing input. In one example, selecting the icon may launch a custom application within the keyboard application 220. A user interface of the custom application may be displayed above the user interface of the keyboard application 220. Alternatively, the user interface of the custom application may take the place of the user interface of the keyboard application 220. Functionality provided by the custom application may be included as part of the keyboard application 220.

In a further example, when the search query returns a plurality of different records, the server 150 will generate a corresponding plurality of unique record IDs, each of which is returned to the keyboard interceptor 240. Once received, the keyboard interceptor 240 will display a corresponding plurality of GUI elements, wherein each GUI element is associated with a respective unique record ID generated by the server 150. In some examples, the keyboard interceptor 240 causes an icon to be displayed in the user interface, which provides a notification indicating how many results have been located as part of the search. The notification may be in the form of a number appearing in a corner of the icon. In this way, the number may dynamically alter as the user types and the search query changes. The icon may take the place of the GUI element described above, providing a notification minimised state of the keyboard interceptor 240. In this case, an indication that relevant data has been located in the search will not immediately be shown to the user as a GUI element, but the icon will indicate that data has been found, by displaying a number, e.g. "1", in the corner of the icon, for example. When the user selects the icon, the GUI element will then be displayed. This notification functionality provides the user with the option of not displaying the GUI element in every instance, but still indicates that data has been located.

When the data is associated with merchants, the custom application may display available deals or other information associated with merchants. The available deals may be displayed without the user providing any input. In this way the user can determine which merchants are currently providing incentives before providing input. Alternatively, or in addition, the merchants displayed in the custom application may be dynamically updated as the user continues typing.

The custom application may itself present an editable GUI element, such as a text field, to the user. In this arrangement, a user typing into the editable GUI element may cause the custom application to function like the keyboard interceptor 240 described above, so that the search query generation, coupon code insertion and survey display etc. can all be performed by the mini-app.

Alternatively, or additionally, the icon displayed in the user interface of the keyboard application 220 may provide access to a settings menu when selected. The settings may allow a user to adjust one or more settings relating to the keyboard application 220. Example settings that may be adjusted include user interface of the keyboard application 220 appearance, what information relating to the located data should be displayed within the user interface of the keyboard application 220, and preferences regarding which merchants should be shown.

In the examples described above the keyboard application 220 is presented as a standalone application that is downloaded to a user's mobile device or as an application associated with a mobile network operator and downloaded to the user's mobile device as part of provisioning by the network operator. It is to be understood that the keyboard application 220 may be associated with any third-party application, including applications for peer-to-peer messaging and gaming Additionally, or alternatively the functionality of the keyboard application 220—including the keyboard interceptor 240—may be coded into or otherwise embedded in a third-party application.

In a further example, data (e.g. coupon codes, surveys, media) sourced by the server 150 may be specified or restricted by a third-party entity. For example, when the keyboard application 220 is a third-party application provided by a third-part entity, the third-party entity can determine that only certain deals should be made available to the user. In one case, the third-party entity is a merchant that would like a user to see only deals associated with themselves so as to prevent the user from potentially using a competitor merchant.

In the case where the keyboard interceptor 140 communicates with the server 150 to locate data associated with the search request, the record identifier associated with the third-party entity may be included in the search request so that the server 150 only searches for deals associated with the third-party entity. A similar process may occur in the case where the keyboard application 220 searches local storage 280 for data.

In some examples, in addition to storing the coupon code, an identifier associated with the selection of the GUI element may be stored. The identifier may be a randomly generated click ID, as described previously. The identifier may be stored in the database 160 and/or locally, for example in storage 280 on the mobile device 200. The identifier may further be stored in association with one or more of a user identifier, a time and date of coupon code location, and a location of the user at the time that the coupon code was located. Storage of the identifier in association with the generation of the coupon code can be used to track a user's coupon code history. The storage of the identifier may further allow the provider of the keyboard interceptor 240 to earn a reward for providing the coupon code to the user. In other words, locating the coupon code may be a reason why a purchase was made, and so the provider of the keyboard interceptor 240 may be rewarded by the merchant associated with the purchase. In this case, the web browser application 250 may store a cookie comprising the identifier associated with the selection of the GUI element. This may allow a merchant to track whether a purchase on the merchant's website followed the location of a coupon code by the keyboard interceptor 240. In one example, the merchant may: verify that a purchase was made, verify that a coupon code was used, and determine the time that the purchase was made. This data, along with the identifier, may be forwarded to the server 150. The server 150 may perform a search for the identifier and verify that the user made the purchase following the location of the coupon code.

In further examples, other data relating to the brand associated with the record identifier may be displayed to the user in response to the location of data in addition, or alternatively, to the one or more coupon codes. The data may include one or media items stored in the database and associated with the same record as the located data. In some examples, the keyboard interceptor 240 may receive one or more media items associated with the brand. The media may be displayed to the user in addition to the GUI element indicating that a deal has been located corresponding to the merchant. This further incentivises the user to visit the merchant's website.

Figure 9:
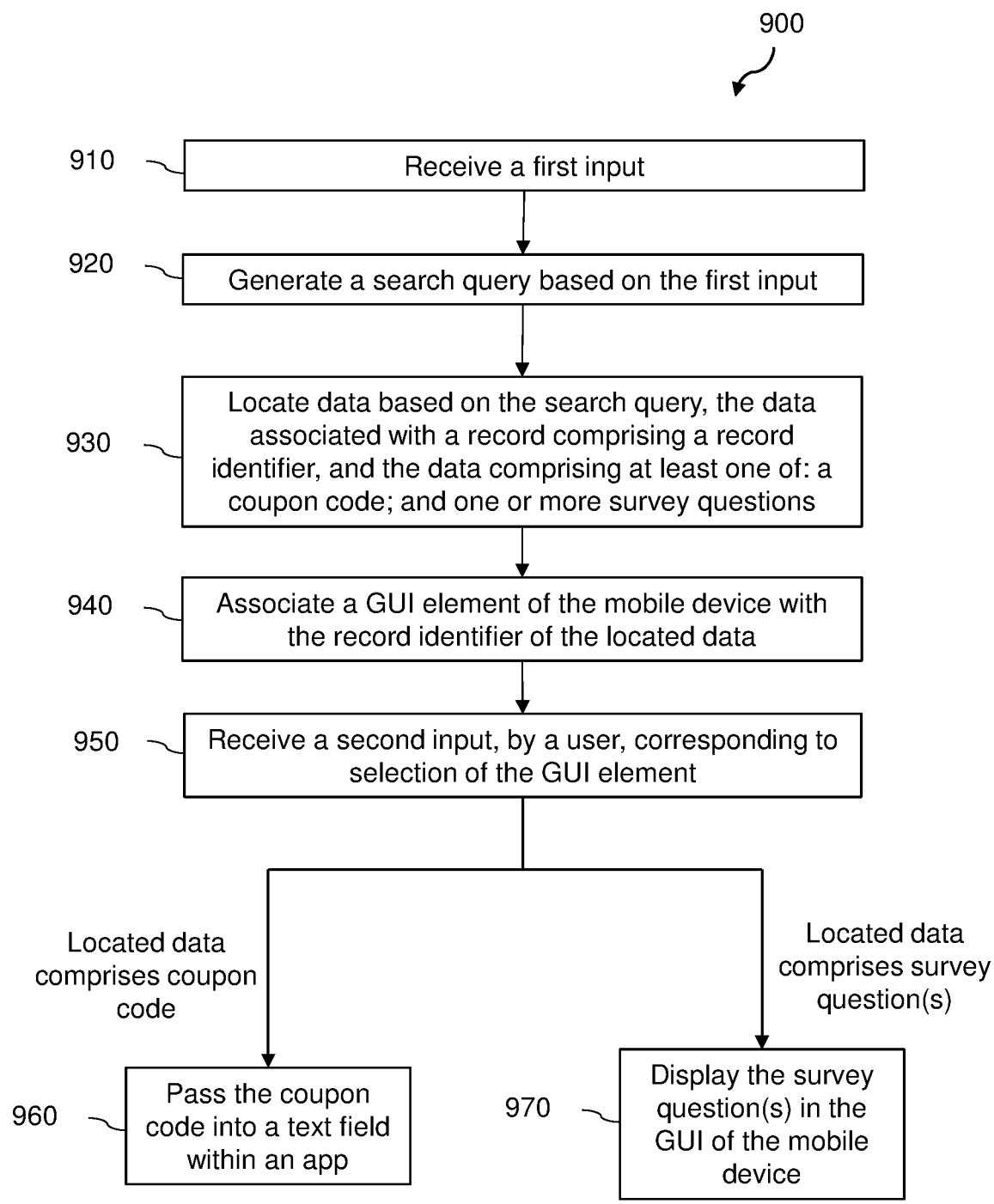
FIG. 9 is a flow chart of a method according to yet a further example.

FIG. 9 sets out, in broad terms, steps performed by a mobile device, such as the mobile device 200 according to the embodiments described above. At block 910, the method 900 involves receiving, by a keyboard application 220 executing on the mobile device 200 a first input. The first input may be obtained from a user providing the first input. The user may be providing input to a field within an application executing on the mobile device or e.g. into a search bar displayed by the keyboard application 220. The search bar may be displayed whenever the keyboard is active or displayed by selecting an option within the user interface of the keyboard.

In another example, the first input may be an indication of the current application executing on the device. The indication may include an application identifier that uniquely identifies the application.

In another example, if the current application is a web browser application 250, the first input may comprise a URL of a webpage currently being viewed by the user, or a domain name associated with the URL. For instance, the keyboard application 220 may receive data indicative of current content displayed within the GUI of the mobile device 200, and determine a URL and/or a domain name by analysing the data indicative of the current content. The URL may be obtained by any of the methods described above, for example, by obtaining a screenshot of the current GUI of the mobile device and performing image analysis on the screenshot, through the use of an accessibility service 290 executing on the mobile device, or via a web browser extension 255 associated with a web browser application 250 being used to display the current webpage.

At block 920, the method 900 involves generating, by the keyboard application 220, a search query based on the first input. The search query may be formed similarly to what has been described above. In the case that the first input is a voice input, the search query may be generated by first converting the voice input to text using speech to text processing.

When the user provides a first input to the search bar of the keyboard interceptor 240, the search query is generated in a similar fashion to what has been described with respect to steps S310 and S430 in FIGS. 3 and 4, respectively. In this case, the search query may further include an indication that the first input was provided into the search bar. This indication can be used in association with a set of predefined rules to determine what data is to be located. The predefined rules may be determined by the server 150 and/or by the user via preference settings configured prior to use of the keyboard application 240. The predefined rules may define that only a subset of possible data is to be searched when the user uses the search bar. For example, if the user is currently browsing a website, and wants coupon codes relevant to that website, they may wish to only receive coupon codes when using the search bar. In another example, the subset of data to be located may include at least a URL and an indication of one or more deals available on a website associated with the URL. In this case, the search bar may operate in a similar way to described above when a user is typing into an address bar of a web browser application 255. A keyboard application 220 providing a search bar as described above provides a convenient way for a user to access data associated with a brand without requiring a web browser extension (which may not be available on certain mobile devices and/or mobile operating systems) or having to open additional web browser tabs to search for coupon codes, surveys or other data related to the brand.

When the first input comprises a URL, generating the search query may involve identifying the domain name, one or more of keywords, brand names, and brand slogans from within the URL. The search query is then generated in a similar fashion to what has been described with respect to steps S310 and S430 in FIGS. 3 and 4. Further, the search query may include an indication that the search terms were obtained from monitoring the user interface. The indication may be used by the server 150 to determine what data to locate and send to the keyboard interceptor 240. As described above, a set of predefined rules may be used to determine what data to locate. For example, a user may only want to see coupon codes relevant to the website they are browsing. The predefined set of rules be determined by the server 150 and/or by the user, via preference settings configured prior to use of the keyboard application 220.

At block 930, the method 900 involves locating data based on the search query, wherein the data is associated with a record, the record comprising a record identifier. The data comprises at least one of: a coupon code and one or more survey questions associated with the record.

At block 940, the method 900 involves associating, within a user interface of the keyboard application 220, an element of a graphical user interface, GUI, of the mobile device, with the record identifier. The GUI element may display one or more pieces of metadata associated with the located data. In the case that the data comprises one or more coupon codes, the GUI element may display information relating to a specific coupon code. This could be the coupon code itself and/or a discount associated with use of the coupon code. In the case that the data comprises a survey, the GUI element may display information associated with the survey such as a title of the survey and/or a reward provided for completing said survey.

At block 950, the method 900 involves receiving a second input, by the user, corresponding to selection of the GUI element. If the located data comprises a coupon code, then the method 900 may proceed to block 960, whereby the coupon code is passed into a text field within an application executing on the mobile device. As described above, the coupon code may be stored in memory and made accessible for insertion by the keyboard application 220 e.g. via the clipboard when the user selects the text field. The coupon code may be passed into the text field by the keyboard application 220 or a web browser extension 255.

In some examples, the keyboard interceptor 240 may further detect that the user is typing into a coupon code field, and in response, immediately insert the coupon code into the coupon code field.

In addition to storing/inserting the coupon code, an identifier associated with the selection of the GUI element may be stored as has been described above. The identifier may be a randomly generated click ID. The web browser application 250 may store a cookie comprising the identifier associated with the selection of the GUI element. This may be done by generating a unique tracking link as has been described above. This allows a merchant to track whether a purchase on the merchant's website followed the location of a coupon code by the keyboard interceptor 240. The merchant may further forward an indication of a purchase to the entity associated with the server 150 along with the identifier associated with the selection of the GUI element. The entity associated with the server 150 may then associate the purchase to the user, and claim a reward from the merchant in exchange for providing the coupon to the user.

In some examples, the keyboard interceptor 240 may cause a new tab to be opened within the web browser application 250. The cookie may then be stored, by the web browser application 250, in the new tab. Once the cookie has been stored, the keyboard interceptor 240 may cause the new tab to close. This process allows the cookie to be stored without reloading the current webpage being viewed by the user. When a web browser extension 255 is present, the web browser extension 255 may cause the new tab to be opened so that the cookie can be stored in the new tab, and closed once the cookie is stored. In another example, the keyboard interceptor 240 or web browser extension 255 refreshes the current webpage whereby to store the cookie.

If the located data comprises one or more survey questions, then the method 900 may proceed to block 970, whereby the keyboard application 220 displays the one or more survey questions in the GUI of the mobile device 260. On completion of the survey, a new entry in the database 160 is created. The new entry comprises the identifier associated with the selection of the GUI, the user's answers to the survey questions, a survey identifier, and a user identifier. Data stored in this new entry can be used by an entity associated with the database 160 to obtain a reward from the merchant.

It is understood that both coupon codes and one or more survey questions could be located at block 930. In this case, there may be more than one GUI element associated with the record identifier of the located data, each of the GUI elements corresponding to a respective coupon code and survey.

In some examples, responsive to receiving the second input, the keyboard application 220 may further generate, without user input, a unique tracking link comprising a URL and a randomly generated identifier, the URL being for a website associated with the located data. The keyboard application 220 may then pass the unique tracking link to an address bar of a web browser application 250. In another example, the keyboard application 220 may cause any application currently being accessed to display the website associated with the URL via a system service such as Android WebView or Web Views on iOS. The coupon code and/or one or more survey questions may then be made available to the user once the user has been navigated to the website.

When the located data comprises a coupon code, the method 900 may further comprise determining, by the keyboard application 220, that the text field is a text field designated for coupon codes. Determining that the text field is designated for coupon codes may be performed as described above, and may include analyzing, by the keyboard application 220, a screenshot of the GUI of the mobile device, or receiving, by the keyboard application, the designation from an autofill service or web browser extension.

When one or more survey questions are displayed, the method 900 may then further comprise receiving one or more further inputs by the user corresponding to completion of the survey. In response to receiving the one or more further inputs, the method may further involve storing, in a database, the randomly generated identifier, a user identifier, and data indicative of the one or more further inputs. The stored randomly generated identifier, user identifier, and data indicative of the one or more further inputs may allow a merchant to determine that the user has completed the survey. A further GUI element may be displayed on indicating completion of the survey. A reward may then be issued by the merchant in response to determining that the user has completed the survey. The reward may be issued to an entity associated with the keyboard application 220. The entity associated with the keyboard application 220 may then award a portion of the reward to the user.

Displaying Media

In a further example, the keyboard interceptor 240 may be provided by a keyboard application 220 associated with an entity, along with a keyboard SDK 230. For example, the keyboard application 220 may be an entity's official app. In this case, the keyboard interceptor 240 provides the possibility of further interaction by displaying data to the user on an ad-hoc basis. In particular, the database 160 may comprise data associated with an entity providing the keyboard application 220, and this data may be communicated to the keyboard interceptor 240. For example, whenever the keyboard application 220 is active and displaying a keyboard in the graphical user interface of the mobile device 200, the entity may use the keyboard interceptor 240 to display one or more media items above the keyboard. In this case, the keyboard interceptor 240 may send a request to the server 150 for data in a record associated with the entity. What data is communicated back to the keyboard interceptor 240 may depend on a set of rules defined by the entity. In one example, the data may relate to a particular advertisement campaign associated with the entity. The data may include media such as any of text, images, video, and/or audio which may entice the user to visit a website associated with the entity. In one case, a selection of any of the media items will generate a unique tracking link, according to any of the methods described above. In another example, the brand may use the keyboard interceptor 240 to display metadata associated with one or more surveys without requiring input from the user. The metadata associated with the surveys, and the survey questions themselves, can be retrieved from the database. This allows the entity to reach out to the user whenever the keyboard is active.

In some examples, the keyboard SDK 230 is configured to pass media and/or content accessed by the user when using the keyboard application 220 associated with the entity to the keyboard interceptor 240. In this way, the keyboard interceptor 240 does not need to communicate with the server 150 to retrieve and display data. Instead, data stored in association with the keyboard application 220 may be communicated to the keyboard interceptor 240 for display to a user. For instance, whenever the keyboard is active, the keyboard application 220 may be running in the background and communicating data to the keyboard interceptor 240. In one example, the keyboard application 220 communicates with a server associated with the entity to obtain the media and/or content. In another example, the keyboard application 220 locates the media and/or content stored locally on the mobile device 200. The keyboard SDK 230 may also provide tracking functionality that enables a determination of what media has been accessed by the user. This can be used to determine what to display to the user next.

As has been described, the keyboard interceptor 240 may be configured to receive input from a user in the form of text, images, video and audio. In a further example, the keyboard interceptor 240 may be provided alongside the keyboard SDK 230 as part of a merchant's app. In this case, when the user has made a purchase from the merchant that is not related to use of the keyboard interceptor 240, for example, if the user has made a purchase at a physical store, then the keyboard interceptor 240 may allow a user to input an image of their physical receipt. This may allow the user to upload a proof of purchase from outside the merchant's app.

In other examples, the keyboard interceptor 240 may be configured to accept images of codes, such as Quick Response (QR) codes. If a QR code encodes a URL corresponding to a website, the keyboard interceptor 240 may analyse the URL to determine whether a matching URL appears in the database 160. If a positive match is found, the keyboard interceptor 240 may cause the user to be directed to the website via a unique tracking link, generated as described above, instead of via the URL that was encoded in the QR code.

The above embodiments are to be understood as illustrative examples. Further embodiments are envisaged.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method comprising:
    detecting, by a keyboard application executing on a mobile device, an application currently executing on the mobile device;
    receiving, based on the detecting and by the keyboard application, a first input, wherein:
        the first input comprises an indication of a webpage currently being accessed when the detecting indicates that the application is a web browser application; and
        the first input comprises an indication of the application when the detecting indicates that the application is not a web browser;
    generating, by the keyboard application, a search query based on the first input;
    locating data based on the search query, wherein the located data is associated with a record, the record comprises a record identifier, and the located data comprises at least a coupon code;
    after locating the data comprising the coupon code, and when a user has navigated to a checkout or shopping cart page within the detected application, determining, by the keyboard application, that a text field within the detected application and within the checkout or shopping cart page is a text field designated for coupon codes;
    associating, by the keyboard application, a graphical user interface, GUI, element of the mobile device, with the record identifier of the located data;
    receiving, by the keyboard application, a second input, by the user, corresponding to selection of the GUI element; and
    responsive to receiving the second input, causing, by the keyboard application, the coupon code associated with the located data to be passed into the text field.

2. The method according to claim 1, wherein the detected application is a web browser application, the method further comprising:
    receiving, by the keyboard application, data indicative of current content displayed in the GUI of the mobile device; and
    determining, by the keyboard application, a domain name associated with the webpage currently being viewed by the user by analyzing the data indicative of the current content displayed in the GUI of the mobile device,
    wherein the first input comprises the determined domain name.

3. The method according to claim 2, wherein the data indicative of the current content displayed in the GUI of the mobile device comprises a screenshot of the GUI of the mobile device.

4. The method of claim 2, wherein the current content displayed in the GUI is received from an accessibility service operating on the mobile device.

5. The method according to claim 1, wherein the detected application is a web browser application, the method further comprising:
    receiving, by the keyboard application, and from a web browser extension associated with the web browser application, a Universal Resource Locator (URL) of a website currently being accessed via the web browser application, and
    wherein the first input comprises a domain name associated with the received URL.

6. The method according to claim 1, wherein detecting, by the keyboard application, the application currently executing on the mobile device comprises;
    receiving, by the keyboard application, and from the application currently executing on the mobile device, an identifier associated with the application that uniquely identifies the application.

7. The method according to claim 1, further comprising: responsive to receiving the second input:
    generating, by the keyboard application and without user input, a unique tracking link comprising a Universal Resource Locator (URL) and a randomly generated identifier, the URL being for a website associated with the located data; and
    passing, by the keyboard application, the unique tracking link to an address bar of a web browser application executing on the mobile device.

8. The method according to claim 1, further comprising storing, by the keyboard application, the coupon code in memory.

9. The method according to claim 1, wherein determining that the text field is a text field designated for coupon codes comprises analyzing, by the keyboard application, a screenshot of the GUI of the mobile device.

10. The method according to claim 1, wherein determining that the text field is a text field designated for coupon codes comprises receiving, by the keyboard application, a field designation type from an autofill service operating on the mobile device.

11. The method according to claim 1, wherein the detected application is a web browser application, and determining that the text field is a text field designated for coupon codes comprises receiving, by the keyboard application, a field designation type from a web browser extension associated with the web browser application.

12. The method according to claim 1, further comprising, responsive to receiving the second input:
   generating, by the keyboard application and without user input, a randomly generated identifier associated with the selection of the GUI element;
   storing, in a database, the randomly generated identifier in association with the record identifier and a user identifier;
   storing, by a web browser application, a cookie comprising the randomly generated identifier associated with the selection of the GUI element.

13. The method according to claim 12, further comprising:
   causing a new tab to be opened within the web browser application, wherein the cookie is stored when the new tab is opened; and
   causing the new tab to be closed when the cookie has been stored.

14. A tangible, non-transitory computer-readable memory comprising instructions, that when performed by a processor of a mobile device, cause a keyboard application executing on the mobile device to:
   detect an application currently executing on the mobile device;
   receive, based on the detecting, a first input, wherein:
      the first input comprises an indication of a webpage currently being accessed when the detecting indicates that the application is a web browser application; and
      the first input comprises an indication of the application when the detecting indicates that the application is not a web browser;
   generate a search query based on the first input;
   send a request to locate data based on the search query, wherein the located data is associated with a record, the record comprises a record identifier, and the located data comprises at least a coupon code;
   after locating the data comprising the coupon code, and when a user has navigated to a checkout or shopping cart page within the detected application, determine that a text field within the detected application and within the checkout or shopping cart page is a text field designated for coupon codes;
   associate, by the keyboard application and responsive to receipt of a said record identifier, a graphical user interface, GUI, element of the mobile device, with the record identifier of the located data;
   receive, by the keyboard application, a second input, by the user, corresponding to selection of the GUI element; and
   responsive to receiving the second input, pass, by the keyboard application, the coupon code associated with the located data into the text field.

15. The tangible, non-transitory computer-readable memory according to claim 14, wherein the first content comprises current content displayed in the GUI that is received from an accessibility service operating on the mobile device.

16. The tangible, non-transitory computer-readable memory according to claim 14, wherein the detected application is a web browser application, and the tangible, non-transitory computer-readable memory comprising further instructions, that when performed by the processor, cause the keyboard application to:
   receive, from a web browser extension associated with the web browser application executing on the mobile device, a Universal Resource Locator (URL) of the webpage, and
wherein the first input comprises a domain name associated with the received URL.

17. A system comprising:
   a tangible, non-transitory computer-readable memory according to claim 14;
   a database comprising a plurality of records, each of the records comprising:
      a record identifier; and
      data including one or more coupon codes; and
   a server communicatively coupled to the database and configured to locate the data in the database in response to receiving an Application Programming Interface (API) call.

18. The method according to claim 1, wherein the located data comprises one or more survey questions and the GUI element is a first GUI element, the method further comprising:
   associating, by the keyboard application, a second GUI element of the mobile device, with the record identifier of the located data;
   receiving, by the keyboard application, a third input, by the user, corresponding to selection of the second GUI element; and
   responsive to receiving the third input, displaying, by the keyboard application, the one or more survey questions associated with the located data in the GUI of the mobile device.

19. The method according to claim 18, further comprising:
   receiving one or more further inputs by the user, said further inputs corresponding to completion of the one or more survey questions; and
   storing, in a database, data indicative of the one or more further inputs in association with a randomly generated identifier and a user identifier.

20. The tangible, non-transitory computer-readable memory according to claim 14, wherein the located data comprises one or more survey questions and the GUI element is a first GUI element, and the tangible, non-transitory computer-readable memory comprising further instructions, that when performed by the processor, cause the keyboard application to:
   associate a second GUI element of the mobile device, with the record identifier of the located data;
   receive a third input, by the user, corresponding to selection of the second GUI element; and
   responsive to receiving the third input, display the one or more survey questions associated with the located data in the GUI of the mobile device.

\* \* \* \* \*